Aug. 26, 1952   J. L. FERGUSON ET AL   2,608,372
WEIGHING AND FILLING MACHINE
Filed April 12, 1943   11 Sheets-Sheet 1

Inventors
John L. Ferguson
Richard C. Talbot
By Thiess, Olson & Mecklenburger
Attys.

Aug. 26, 1952    J. L. FERGUSON ET AL    2,608,372
WEIGHING AND FILLING MACHINE

Filed April 12, 1943    11 Sheets-Sheet 5

Inventors
John L. Ferguson
Richard C. Talbot
By Thiess, Olson & Mecklenburger
Attys.

Aug. 26, 1952 J. L. FERGUSON ET AL 2,608,372
WEIGHING AND FILLING MACHINE
Filed April 12, 1943 11 Sheets-Sheet 6
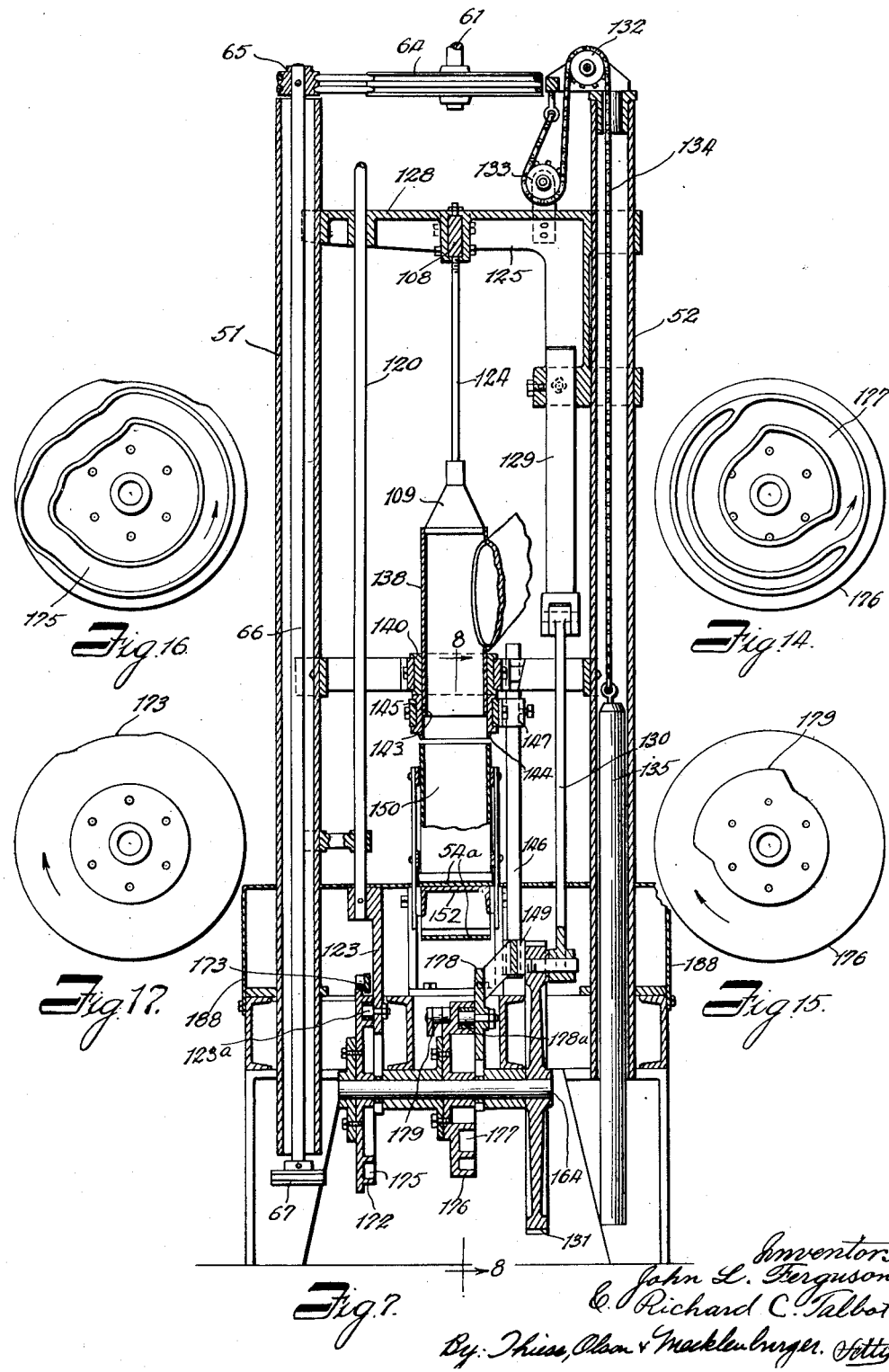

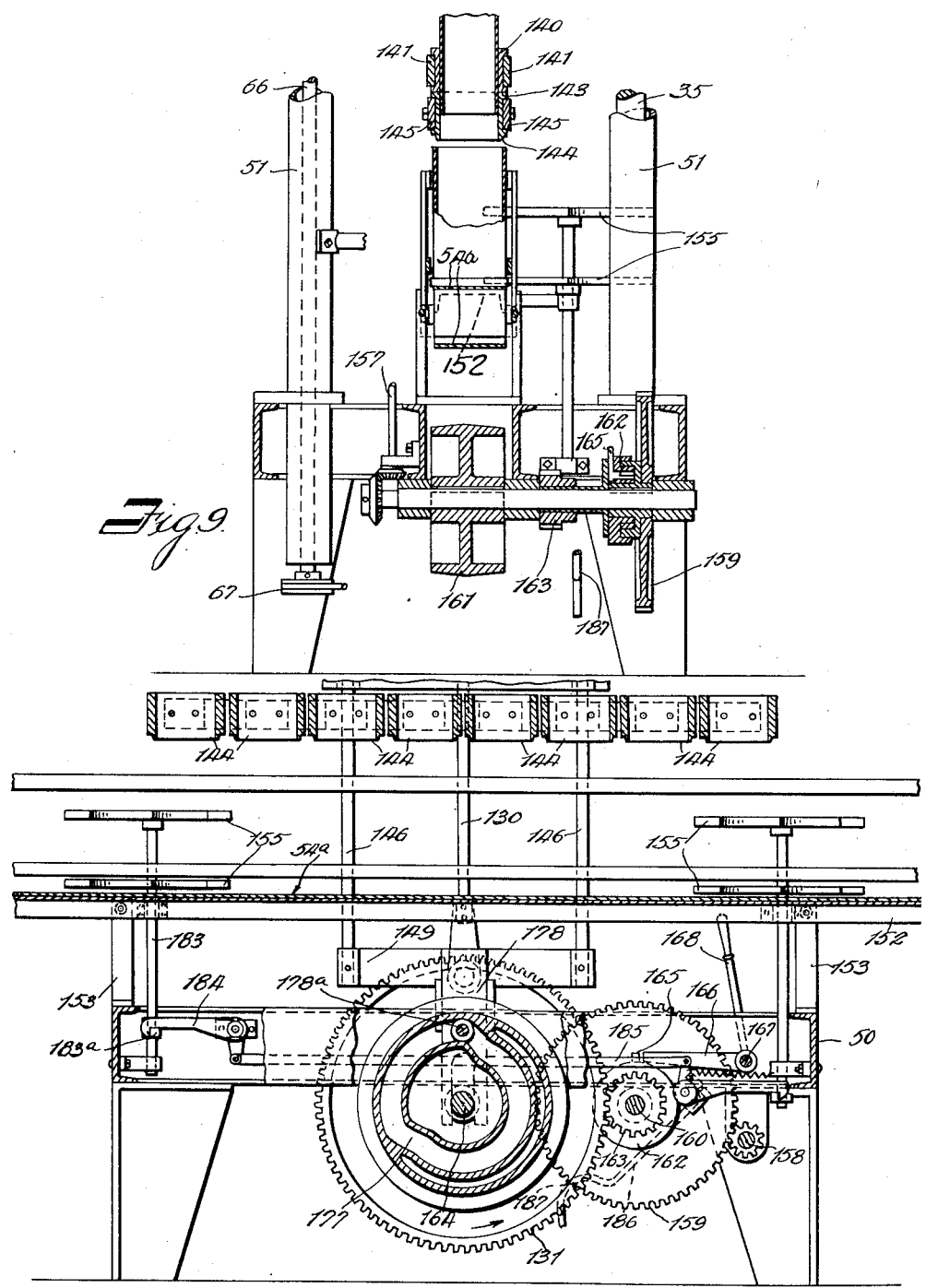

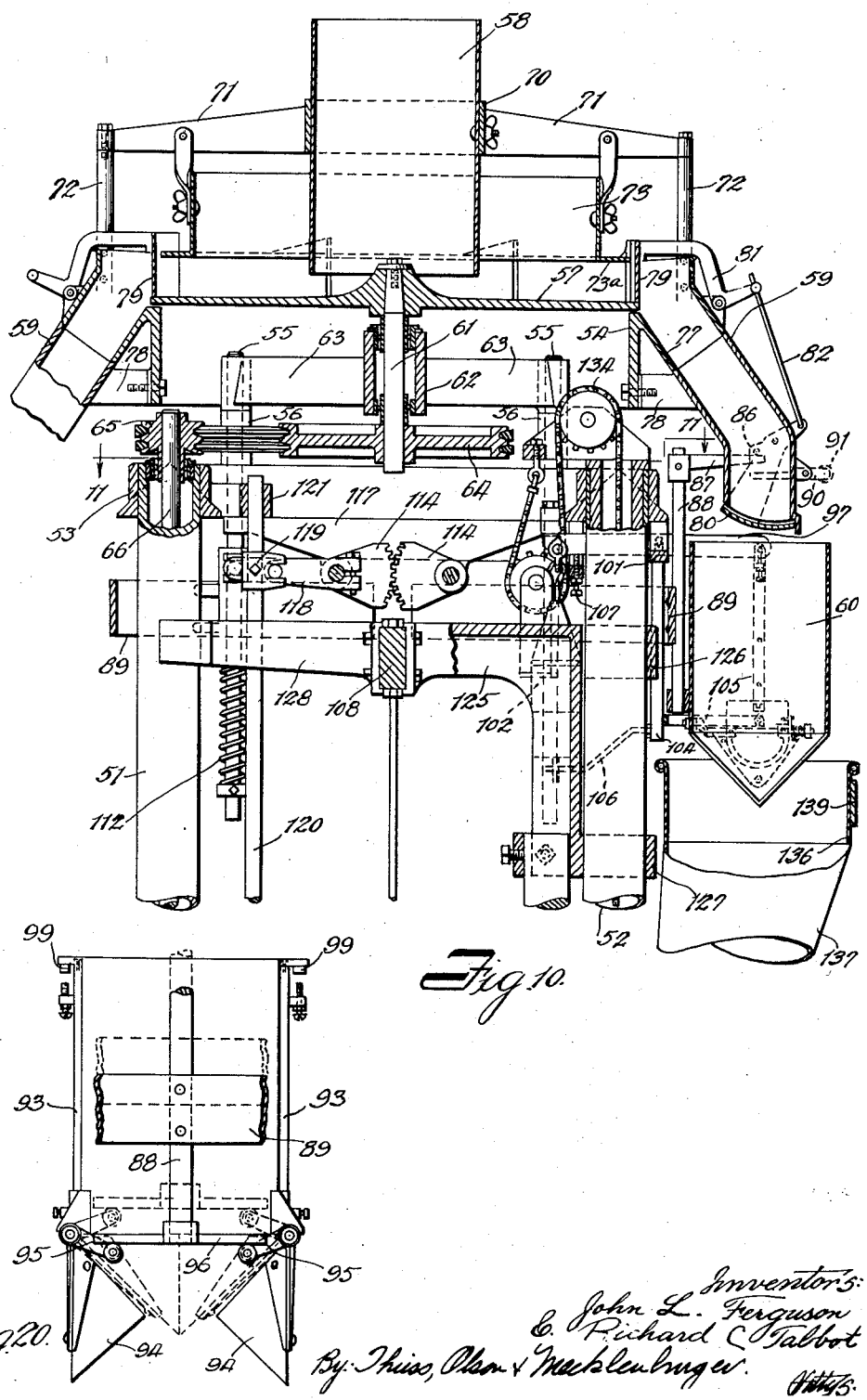

Aug. 26, 1952 J. L. FERGUSON ET AL 2,608,372
WEIGHING AND FILLING MACHINE
Filed April 12, 1943 11 Sheets-Sheet 9

Inventors
John L. Ferguson &
Richard C. Talbot
By Thiess, Olsen & Mecklenburger. Attys Aug. 26, 1952 J. L. FERGUSON ET AL 2,608,372
WEIGHING AND FILLING MACHINE
Filed April 12, 1943 11 Sheets-Sheet 10
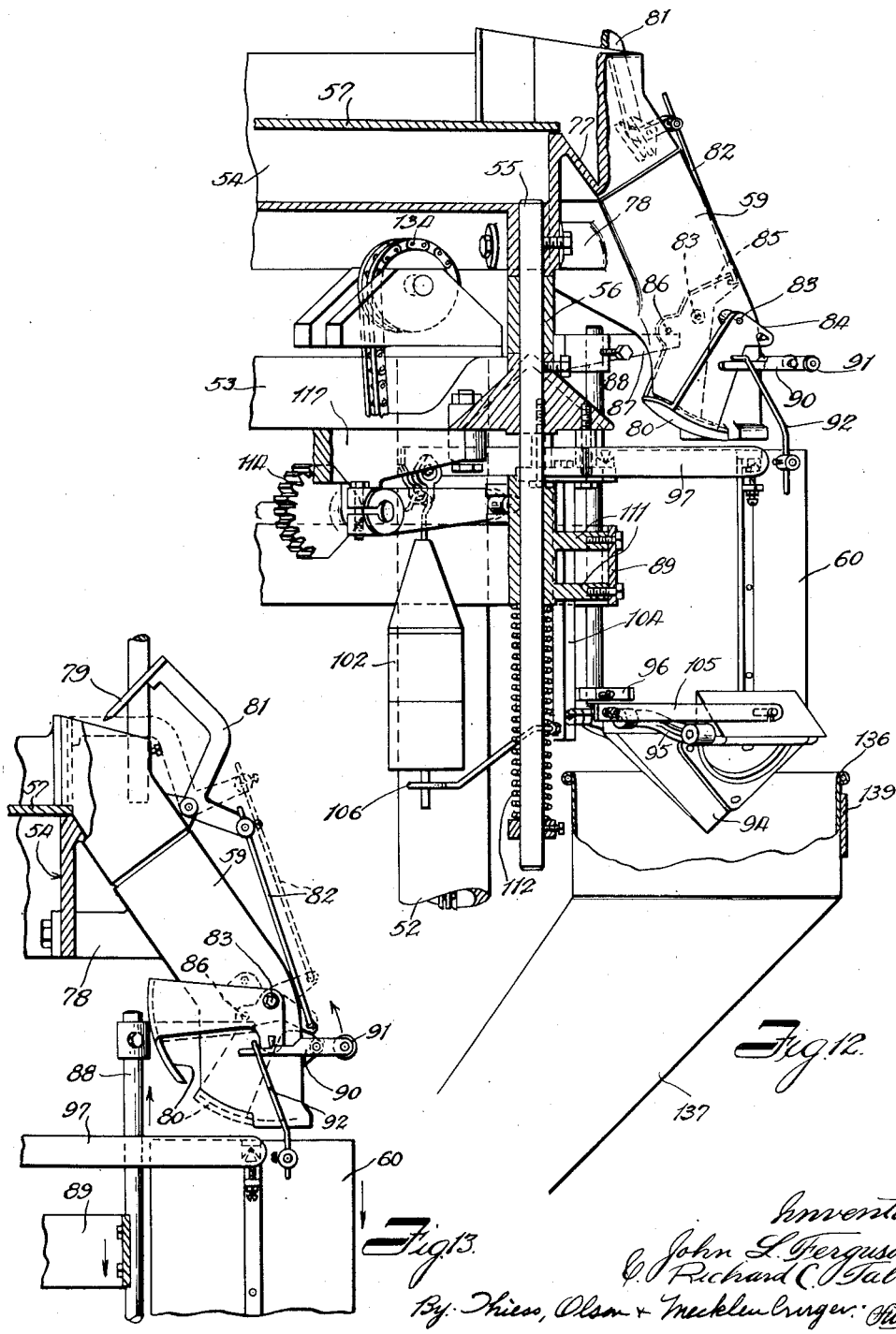

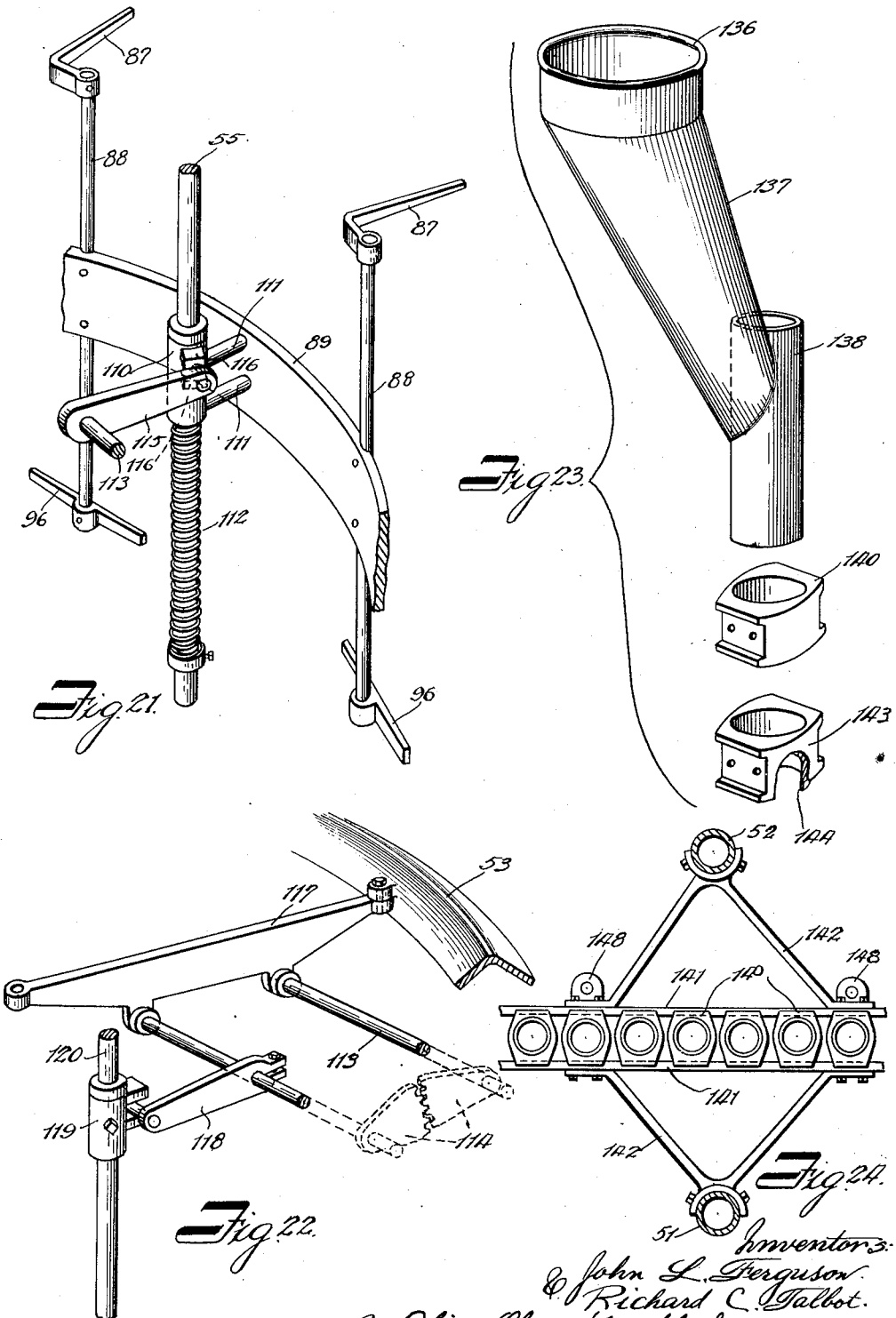

Patented Aug. 26, 1952

2,608,372

UNITED STATES PATENT OFFICE 2,608,372

WEIGHING AND FILLING MACHINE

John L. Ferguson and Richard C. Talbot, Joliet, Ill., assignors to J. L. Ferguson Company, Joliet, Ill., a corporation of Illinois Application April 12, 1943, Serial No. 482,734

41 Claims. (Cl. 249—22)

This invention relates particularly to machines for weighing and filling ultimate containers, cartons or packages with non-free flowing fragile flake material, such as cereals, soap flakes, granules, powder), etc., ground or pulverized products, such as cornmeal, cornstarch, grits, barley or the like, and any comminuted or particulated material where accuracy in weighing is important.

With such materials or products, it is important that the flow of the material be maintained uniform so that the weighing may be accurate and uniform, and in the case of so-called multiple filling, that the several parts or streams may be substantially equal and uniform for the same purpose.

With fragile flake material, it is likewise important that the means for force feeding be not such as to mutilate the flakes.

Accordingly this invention contemplates means for force-feeding such materials uniformly without mutilation of delicate products, and further, if desired, of separating the same into a plurality of substantially equal and uniform parts or streams for the multiple filling and weighing of containers or the like.

In carrying out this portion of the invention, a power-driven rotary disc, sometimes called a feeder disc, is interposed in the flow line of the material from the supply hopper. The material is fed to the upper flat, smooth and polished face of the feeder disc and centrally thereof. Under the influence of the rotation and centrifugal force, the material spreads out evenly and uniformly over the face of the disc in a gradually thinning layer as it travels to the outer edge where it passes or is thrown off by centrifugal force in a uniform stream into one or more receiving openings.

This invention also contemplates that the lower end gates of the control chambers which are above the weighing buckets or receptacles shall be closely adjacent the buckets in filling position, so that when the buckets descend under the weight of the material, the gate is closed and only a small amount of unweighed, but accurately measured, material goes into the bucket after the closing of the gate.

It is also desirable, convenient and space-saving, in a machine of this type, to weigh, fill, and pack a plurality of containers in a single row. This is conveniently done in this machine, eight containers preferably being handled at a time, which are positioned by a conveyor in a row over the bed of the machine and under the hoppers or spouts or chutes from the weighing receptacles or buckets. The horizontal centrifugal feeder disc above in this particular machine is comparatively large, and the weighing control chambers which receive the material from the edge of the disc and the weighing receptacles directly beneath, which in turn receive the material from the control chambers, extend down and around in a circle from the edge of the circular feeding disc.

From beneath these weighing buckets or receptacles, which in this machine are thus positioned in a horizontal circle, inclined discharge hoppers or spouts lead down to a position in a straight line just above the line of containers or cartons waiting to be filled. This converts the circular arrangement of the hoppers or spouts at their upper ends into a straight line arrangement at their lower ends, and leaves a corresponding space between their upper parts.

It is desirable in handling some products to pack them in the containers or cans in the filling operation. This is usually done by a plunger entering the container on top of the contents and pressing down upon the same. This method is commonly referred to as plunger packing. In the present machine, advantage is taken of the space referred to between the upper inclined ends of the discharge hoppers and the weighing buckets for locating the packing plunger apparatus. The inclined hoppers or spouts terminate at their lower ends in vertical tubular portions just above the containers. The plungers pass through these vertical portions onto the material in the containers suitably to pack the same therein. The vertically reciprocating crosshead for these plungers and the plunger rods are located in the space between the upper ends of the outwardly inclined discharge spouts or hoppers and the weighing receptacles. The hoppers and weighing buckets are divided into two groups of four each, one group on each side of the crosshead, plunger rods and plungers.

It is also important in connection with such machines that the containers be not marred or mutilated by the belt conveyors employed to transport empty containers to the filling station and filled containers from the filling station. It is also important that these operations be carried out with the greatest speed and efficiency. In the ordinary machine, the containers are stopped at the point of filling while the conveyor belt continues to operate. This results in marring the bottom of the containers or mutilating the sides, and causes them to tip backward when released. It is sometimes arranged to elevate the containers slightly above the moving belt for filling. This also creates a tendency for the filled containers to tip backward after they have been filled and dropped back onto the conveyor, and limits production.

Another method is to stop the conveyor belt during the filling operation and then to start it again at a fixed speed by means of a dog clutch. This also creates a tendency for the filled cartons to tip backwards and consequently so to limit the speed of production that it is impractical.

It is, therefore, an object of this invention to eliminate the disadvantages set forth and to provide an intermittent and variable speed conveyor belt on which the containers may rest during packing and which gradually starts and stops in its travel. In this case the belt comes to a stop by gradually slackening the belt tension until it is loose on a continuously operated drive pulley. The belt again starts by gradually tightening it around the drive pulley. By this method, the containers are not marred or mutilated, they do not tip backward on account of the slow starting speed of the belt, and the containers may rest on the conveyor belt during the plunger packing operation, whereby a greater rate of production is insured.

Other objects and advantages will appear from the specification and claims.

In the drawings which illustrate an embodiment of the invention and in general are drawn to scale—

Fig. 7 is a vertical section of the machine taken through the supporting posts, on line 7—7 of Fig. 1, the parts above the posts and around their upper ends being omitted;

Fig. 8 is a longitudinal section through the base of the machine taken on line 8—8 of Fig. 7, and showing the cam for operating the drop spouts, etc.;

Fig. 9 is a detail cross-sectional view through the pulley and shaft for driving the conveyor belt and associated parts;

Fig. 10 is a detailed cross section of the upper part of the machine, showing the mechanism at and around the upper ends of the two supporting posts of the framework of the machine;

Fig. 12 is a detailed vertical section through one of the feeder housing supporting posts, taken on line 12—12 of Fig. 11;

Fig. 13 is a detail side view of one of the control chambers and its operating gates;

Figure 19:
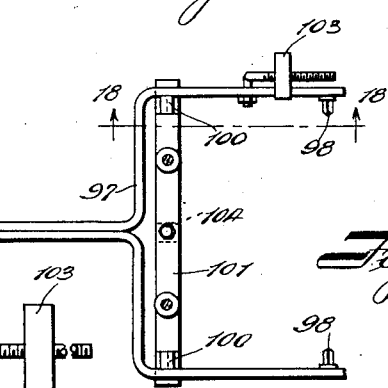
Figure 18:
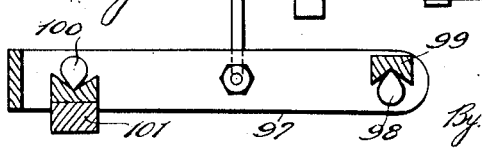

Figs. 14 and 15, sheet 6, are views of the opposite sides or faces, respectively, of the cam disc for operating the drop spouts and the conveyor belt tightener;

Figs. 16 and 17, sheet 6, are similar views of the opposite faces of the cam disc in the base of the machine for operating the control chamber and weighing bucket gates;

Figs. 18 and 19, sheet 9, are, respectively, detail views of a vertical section and plan of the bucket weighing scale beam;

Fig. 20, sheet 8, is a detail view in elevation of the weighing bucket bottom gates and the operating arm therefor;

Fig. 21, sheet 11, is a detail perspective view of a portion of the split ring with its sliding mounting on a post of the machine and carrying the control gates and bucket bottom gates operating arms;

Fig. 22 is a detail perspective view of a portion of the means for raising and lowering the split ring;

Fig. 23 is a perspective view of the hopper spout for guiding the product from the weighing buckets to the containers, with the supporting collar for the spout and the drop spout shown separated from the vertical portion of the spout to which they are normally applied;

Fig. 24 is a detail plan view of these hopper spout collars with their side supporting bars and angle braces from the posts of the framework of the machine.

The product to be weighed and filled in the containers or cartons is discharged from a suitable hopper or storage bin (not shown) through a conduit or pipe at the extreme top of the machine onto a continuously rotating horizontal disc, which discharges the material by centrifugal force into some eight control chambers around the edge of the disc. These control chambers are in reality chutes with gates at each end, leading downwardly from the edge of the disc to the weighing receptacles or buckets immediately beneath.

These buckets, of which there are eight in this machine, individually weigh the material for a container or carton, and when all buckets are filled and weighed they are automatically dumped or discharged into hopper spouts leading down to the empty containers beneath, standing preferably in a straight-line group of eight, on a belt conveyor which has brought them into position to receive the material.

When the material is thus discharged into the containers and packed therein, the conveyor moves this group of filled containers out of the machine and brings in another group of eight empties. In the meantime the preliminary steps of the weighing have been started over again.

The machine shown in the drawings has a supporting framework consisting of a rectangular bed table 50 with two hollow cylindrical posts 51 and 52 extending upwardly from midway of the two side members of the bed and a horizontal ring casting 53 secured to the upper ends of the posts.

The machinery and other parts are all supported directly or indirectly by this framework, the electric driving motor, operating cams, gearing, etc., being located in the bed, the belt conveyor 54a for the containers being supported over the bed longitudinally thereof and extending between the posts, and the weighing and filling mechanism being at and around the top of the posts, as hereinafter described.

Figure 11:
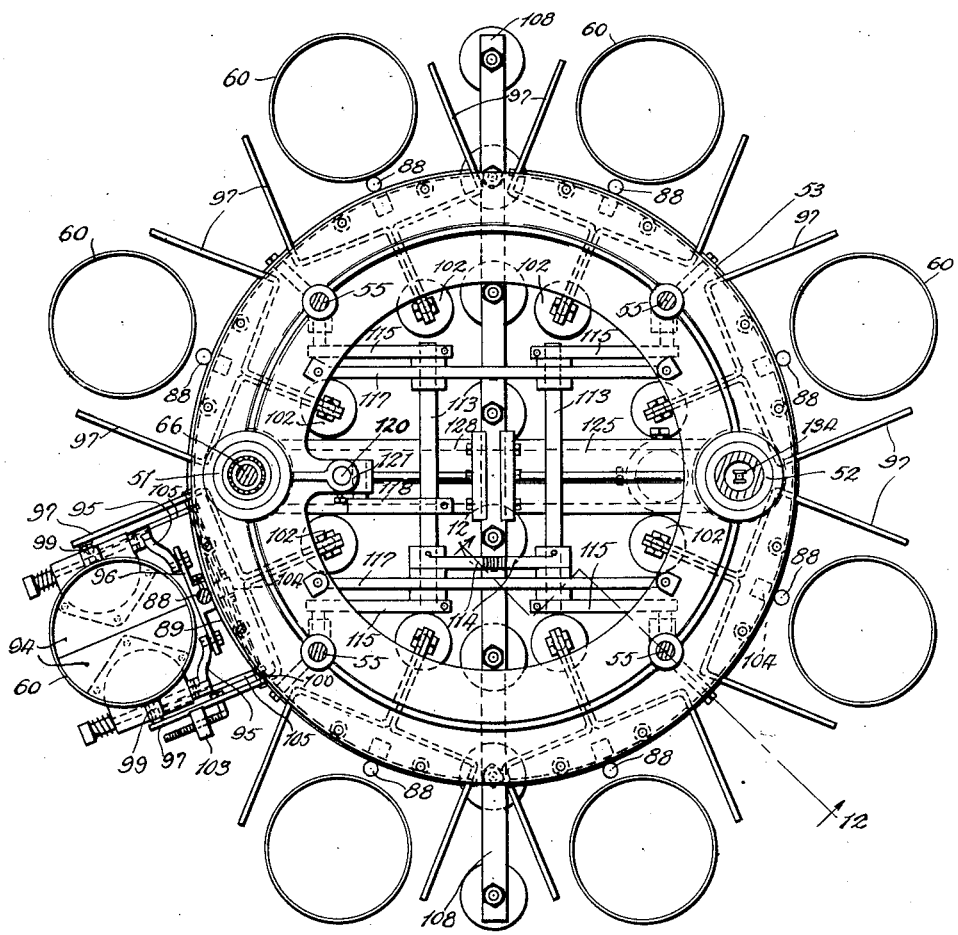
Fig. 11 is a sectional plan view taken on a plane just at the top of the frame ring secured to the upper ends of the two side posts of the machine and indicated at 11—11 of Fig. 10.

The cast-iron ring 53 at the top of the posts 51 and 52 is generally of an inverted V in cross-section, with suitable holes and walls thereof cast therein for the said posts, and other parts and members as seen in plan view in Fig. 11. It is fixed in position on the posts in any desired way, as, for instance, by set screws passing through the walls of the sockets for the posts and impinging the posts.

This ring 53 supports above it another large ring casting 54 which may be termed a feeder housing because it houses the centrifugal feeder disc and associated parts (see Fig. 10). This feeder housing is supported on the upper ends of four cylindrical posts 55 (Figs. 10, 11 and 12) extending up from ring 53, said posts being 90 degrees apart in the rings and the two rings being spaced apart vertically by sleeves 56 on the posts. Set screws may serve to bind the posts in their sockets in the rings. These four posts 55 extend down below the lower ring 53 for purposes hereinafter described.

The horizontal feeding disc 57 (Fig. 10), which receives the product centrally from the supply pipe 58 and delivers it at its periphery by centrifugal action into the control chambers 59 for the weighing buckets 60, is mounted for rotation on the short vertical shaft 61. Roller bearings in the sleeve 62 support the shaft 61 for rotation and against vertical movement. The sleeve 62 with its four radiating arms 63 forms part of the feeder housing casting 54, the said arms 63 extending radially from the sockets for the posts 55 to the central sleeve 62.

The feeder disc 57 is continuously rotated at the desired speed by a belt pulley 64 on the lower end of the shaft 61, which in turn is driven by the pulley 65 on the upper end of shaft 66 which extends up through the supporting post 51 of the framework of the machine.

This shaft in the post is provided with a belt pulley 67 at the lower end of the post beneath the bed frame (Figs. 4, 5, 7 and 9), which is directly connected by belt 68 with the driving electric motor 69 in the base of the machine.

A product supply pipe 58 (Figs. 3 and 10) is supported by the sleeve ring 70 having the four radial arms 71 supported at their ends by posts 72 which are secured at their lower ends in any desired way to the feeder housing casting 54, preferably to the side walls of the control chambers 59, as shown. The supply pipe is adjustable vertically in any desired way in the supporting ring 70, as indicated by the thumb nut, to various distances above the feeder disc, thereby to vary the flow of the product to the disc.

A flanged sheet-metal ring 73 adjustably supported for height from the arms 71 prevents the product from building up too high at the control chamber inlet gates. Any attempt of the material to build up higher within the ring than the flange 73a results in the stoppage of downflow of the material within the supply pipe 58, so that feeding is automatically stopped.

The feeder disc 57 is preferably of cast iron, is finished all over, especially on the upper surface, and is mounted so as to be substantially horizontal in the flat portion of its upper face. This face is flat from the base of the central upward conical or cone-like projection to the periphery. Any thickening of the web toward the center is on the lower face of the disc. The conical projection affords in this instance room for the shaft connection with the disc and at the same time causes the descending stream or product in the pipe 58 to be deflected outwardly for free, equal and uniform distribution in all directions on the face of the disc and toward its edge. Thus there is no dead spot for the product at the center of the disc and no chance for a dead weight of the product to build up on the disc. While the periphery of the disc makes close contact with the adjacent shoulder or ledge of the feeder housing casting 54, there is sufficient clearance therefrom to prevent any substantial frictional drag between the disc and shoulder.

The outer and upper portions of the feeder housing ring casting 54 form the inlets and upper parts of the control chambers 59 into which the product is thrown by centrifugal force from the edge of the disc for the weighing buckets 60. This may be seen in Figs. 3, 10, 12 and 13, where the walls of the upper ends of the outwardly sloping chambers or chutes 59 are shown in outline and in section. There are eight of these, at equal distances apart, four on each side of the longitudinal medial plane of the machine. Referring to one of these in Fig. 3—they are all alike—the outer wall outlining the upper end of the chamber is indicated at 74 and the side walls at 75 and 76. The latter, 76, in each case is not radial with reference to the casting ring but points at an angle to the periphery of the feeder disc, the edge of which it nearly touches and in a direction opposed to its movement. The other end wall 75 extends substantially radially of the circle to the outer face of the wall 76 of the adjacent chamber and is cast integrally therewith. The result is that the chambers in this machine have rectangular entrances opening toward the product coming on the disc and with narrowing top and bottom walls. The inner wall 77 of the upper end of a control chamber is shown in section in Figs. 10 and 12.

The lower ends of the control chambers 59 are also iron castings making a tight joint at their upper ends with the lower ends of the upper portions of the chambers 59 and extending in the same slopes as the sides of said upper part. The lower ends of this lower portion of the chambers 59 bend down vertically and the side walls above converge into a cylinder for this vertical portion, this cylinder being of a size convenient to empty the product into the weighing buckets beneath.

These bottom castings for the control chambers 59 are secured in position to the feeder housing ring 54 by one or more lugs 78, each extending integrally from the casting to the outside of the ring 54, where they are bolted thereto, as shown.

These control chambers 59 between the centrifugal feeder disc 57 and the weighing buckets 60 are provided with inlet and outlet gates 79 and 80, respectively (Figs. 10, 12 and 13).

The inlet gate 79 is a substantially rectangular piece of sheet metal of a size to close the opening to the upper end of the control chamber at the edge of the feeder disc. It is curved longitudinally to correspond to the periphery of the disc, is of a length to span the space between the webs or walls 76 of the feeder housing which define the openings to the control chamber, and is of a height or width corresponding to the free ends of said web 76.

This gate 79 is rigidly mounted in any desired way, as by screws therethrough, at the end of an angle lever or arm 81 which is pivoted between lugs cast on the outside wall of the control chamber upper portion. The end of this arm engages the gate 79 nearer one end than the other due to the offset of the gate opening with reference to the central line of the control chamber. The lever arm is bent to clear the upper edge of the outer chamber wall. Fig. 13 shows this gate and lever in open position in full lines and closed in dotted lines.

The lower edge of the gate 79 is sharpened to enable it to pass down through the product more easily. It is prevented from actually striking the disc by the set screw stop in the adjacent wall.

The other arm of this gate lever 81 is connected by link 82 with the outlet gate below by which the lever 81 and gate 79 are duly operated.

The lower or cut-off gate 80 for each control chamber 59 is of thin sheet metal of a size to completely cover the opening in the lower end of the chamber and curved to conform to a cylindrical surface with an axis at 83, the pivot points of the side members carrying between them the gate member 80. These pivot points are studs cast on the opposite sides of the lower member of the control chamber. As this stirrup-like gate swings back and forth, it opens and closes the lower end of the control chamber.

These two side members of gate 80 are of nearly the same form between the pivots 83 and the curved blade, but are formed differently beyond the pivots. Thus the member shown in full lines in Fig. 12 on the near side of the control chamber 59 has an arm 84 extending substantially at right angles to the main arm; while the other side member of the gate, shown in dotted lines in Fig. 12 and therefore on the far side of the control chamber member, has an arm 85 on the upper side of the pivot extending at an oblique angle to the main arm.

It is the latter arm 85 which is connected by link rod 82 with the short arm of the upper gate lever 81. Accordingly these two gates operate together in the particular connections shown, as will be described later, both being opened simultaneously and closed simultaneously though it will be obvious to those skilled in the art that their opening and closing may be timed otherwise.

The pivot arm of the lower gate 80, shown in dotted lines, has a projection on the upper edge in which is fixed a laterally projecting stud 86. This stud thus projects into the path of the vertical movement of the arm 87 extending horizontally from a vertical post or rod 88, and the gate 80 is thereby opened. This opens also the upper gate 79. The post 88 forms a part of the bucket control, and in turn is fixed to the horizontal semi-circular ring 89 (Figs. 21, 10, 11, 12 and 13), said ring also forming a part of the bucket control and is sometimes referred to as the bucket-operating ring.

This half-ring 89, together with its other half-ring on the other side of the machine, is caused to raise at the proper time in the sequence of operation of the machine, to lift the post 88 and the arm 87 and thereby to open the upper and lower gates of the control chamber. The arm 87 is bent substantially at right angles between its ends, because the post 88 is centrally located behind the control chamber or toward the center of the machine while the gate arm and stud 86 are outside the chamber and therefore offset laterally from the center line. The arm 87, therefore, extends laterally from post 88 to reach from the center line to the side and then outwardly to stand in the vertical path of movement of stud 86.

After the gates are thus opened they are latched open, and the post and its arm 87 descend out of the way of stud 86 on the lower gate arm thereby to permit the closing of the latter by gravity and independently of arm 87 at the proper time, which is when the bucket has become properly filled. Thus, the gates are held open by a laterally extending knife-edge stud on the arm 84 of the side member of the lower gate (Figs. 12 and 13). This stud engages the upper edge of a pivoted lever 90 when in open position, the lever being pivoted on lugs cast on the lower end member of the chamber 59 and having a counterweight 91 on its outer end to cause its opposite end to tend to rise. A notch or shoulder in the upper edge of said lever is engaged by the knife-edge of the pivot stud when the gate is open. This suffices to hold the lower gate open and the latter to hold the upper gate open through the link connection 82 after once being opened by the arm 87, until the knife-edge stud on the lever 84 is freed from the weighted lever 90. This happens when the bucket receives the intended weight of the product and is thereby caused to descend by gravity. When this happens, a small rod 92 adjustably secured at its lower end to the upper rim of the bucket, and having a bent upper end extending laterally over the end of lever 90 and normally slightly above the same, is carried down with the bucket and pulls the lever down away from the pin on the arm 84, thereby freeing the gates and allowing them to drop and close substantially instantaneously under the influence of gravity.

In this manner the opening and closing of the control chamber gates, that is, of the chutes leading from the centrifugal feeder disc to the weighing buckets, are controlled by or in timed relation with the weighing buckets. Thus when the buckets are ready to receive the product and its own bottom gates closed, the control gates above are opened by arm 87. A slight recession of the arm then takes place, thereby lowering the arm 87 on post 88 below the stud 86, so that the latter can drop or swing down without engaging it when the gates are to be closed. Then, when the bucket has received the required weight of material and is thereby caused to move downwardly by gravity, as hereinafter explained, the control chamber gates are instantly closed to shut off the further flow of the product into the bucket.

The next step in the bucket operation, the apparatus for accomplishing which will be explained later, is to open the lower end of the bucket to permit the contents to fall out into the hopper spout leading to the container to be filled. While the buckets are weighed individually, as above stated, they are all emptied simultaneously. And, as will appear, all buckets must be filled and weighed, in normal operation of the machine, before the time for discharging comes around in the cycle of operation.

These weighing buckets 60 (Figs. 10 and 20) are of thin sheet metal, preferably aluminum, cylindrical in form and with vertical reinforcing rails 93 on opposite sides for the reception of hinges and other parts. The bottom of the bucket is formed of half inverted cones 94 individually hinged on opposite sides, so that when closed the bottom forms an inverted conical closure of the bucket and when fully open the whole cross-section of the bucket is open. This facilitates emptying the buckets and filling the containers beneath.

These hinges may be as shown or of any desired construction, but the pintles thereof are each provided with a coiled spring at one end to provide a spring closure for the bottom halves, and the crank arm 95, so to speak, on the inner ends of the pintles. The ends of these arms have laterally extending studs or pins adapted to be suitably engaged by a horizontal transverse bar or shoe 96 at the lower end of the control rod or post 88 before referred to (Figs. 20, 21), which at its upper end carries the arm 87 for engaging and opening the gates in the corresponding control chamber 59. This control rod 88, as heretofore mentioned, stands just in back of the weighing bucket, as may be noted in plan view in Fig. 11.

Consequently, the lowering of control rod 88 will cause its bar or shoe 96 to engage the pins on the bottom gate arms 95 of the bucket and thereby to open the bottom halves against the tension of the spring hinges. Also, if for any reason a bucket has not descended properly in weighing and therefore has not closed the gates of the control chamber, this downward movement of shoe 96 will force the bucket down and thus close the gates. When the post 88 is raised, as indicated in dotted lines in Fig. 20, the hinges are freed and close the bottoms by their springs.

Obviously, this bucket-opening bar 96 and post 88 should be raised sufficiently so that the bottom of the bucket will be closed during the filling of the bucket and at the same time be low enough so that the arm 87 at the upper end will be out of the way of the pin 86 on the side bracket of gate 80 when it falls at the down weighing movement of the bucket. In fact, the cam in the base of the machine which imparts movement through intermediaries to the control rod 88 takes this into account, for in the cycle it first raises to a height sufficient to open the control chamber gates to open latching positions, then drops to a lower position where it is out of the way of pin 86 when the latter drops in the closing of the chamber gates. Then, after a while, when the buckets are all filled and weighed, the control rod drops still further down and sufficiently to open the bucket bottom, as described. There is then given time for the buckets to empty when the control rod 88 starts up again and keeps on going until the control chamber gates are open, the bucket bottom having closed by the spring hinges in the earlier upward movement of the rod 88.

The buckets 60 are supported for accurate weighing by suitable knife-edge bearings in the forked scale beam 97 (Figs. 10, 11, 12, 18, 19), the bucket hanging between the forked members on the knife-edge pivots 98 (Figs. 18 and 19) engaged by suitable bearings 99 at the top of the bucket.

The scale beam itself is pivoted on similar bearings at 100 on a short horizontal bar 101 (Fig. 4) fixed by bolts or other means to the under side of the main ring casting 53 and spaced therefrom suitably to accommodate therebetween the scale beam 97 on the pivots 100.

On the inner end of the scale beam is suitably suspended the balancing weight 102 corresponding substantially to the weight imposed on the other end of the beam by the filled bucket. Any close adjustment is secured by the adjustable weight 103 on the side of one of the forks of the beam (Figs. 18 and 19).

From the center of the scale supporting bar 101, and rigidly secured thereto, depends a squared bar 104. Near its lower end it supports the pivoted links or members 105 projecting horizontally to reach to the opposite sides of the lower end of the bucket, where recesses in the lower edge of the ends thereof fit freely over pins on the sides of the bucket. These permit the free vertical weighing movements and actions of the bucket while preventing swinging of the same.

From the rear of the lower end of the vertical bar 104 a bent wire or light rod 106 extends to a point beneath the scale weight 102, and a loop in the end thereof serves as a general guide for a pin in the bottom of the weight and to prevent its swinging.

An adjustable set screw 107 (Fig. 10), under the inner end of the scale beam 97 supported by any suitable stirrup or bracket from ring 53 limits the downward movement of this end of the beam. The upward movement of this end of the scale beam may be adjustably limited in the same way by a set screw through the ring 53 above.

From the foregoing it is seen that the weighing buckets hang from the stationary ring casting 53 at the top of the posts 51 and 52 of the main framework of the machine and have only a limited vertical movement due to the weighing of the product, and in their downward movement they unlatch the control chamber gates from their open positions thereby permitting the same to close at once by gravity.

It is also seen that the opening of the control chamber gates and the opening and closing of the bucket bottom gates are controlled by the lateral arms at top and bottom, respectively, of the vertical control post 88, which is just in back of the bucket. Since these parts are duplicated for each of the eight buckets, the description of one will, it is thought, suffice for all.

But all said control posts 88, as before stated, are fixedly secured to the split ring or band 89 (Figs. 21, 10, 11, 12, 13, and 20), and are raised and lowered simultaneously in accordance with a cam in the base of the machine.

The ring 89 is split to accommodate between the spaced ends of the halves the vertically reciprocating cross-head 108, which carries the row of eight vertical packing plungers 109 (Figs. 1 and 5) for packing the product in the containers, for such products as are deemed best to be so packed. This cross-head 108 is therefore longer than the diameter of the ring 89, and accordingly the ring is split to permit the ends of the cross-head to extend between the ends of the ring halves.

This split ring is mounted for vertical movement on the lower ends of the four posts 55, which carry the feeder housing ring 54 from and above the frame ring 53 at the top of the side frame posts 51 and 52. For this purpose (Figs. 21, 10, 11, and 12), each post is provided with a short metal bearing sleeve 110, slidable up and down on the post, having two arms or projections 111 extending to the adjacent inside of the ring and secured thereto by bolts or in any desired manner. A coil spring 112 on each post below the bearing sleeve 110 resiliently balances the weight of the ring and attached parts and makes their vertical movements that much easier.

These half rings and their attached parts are designed to move up and down together on the four posts 55 as one ring, because the gates of all the control chambers open simultaneously and the bottoms of all the weighing buckets are opened simultaneously. Accordingly, the two halves of the ring are connected together for vertical movement by the short horizontal shafts 113 (Figs. 10, 11, 21, and 22), having thereon the intermeshing gear segments 114, and on the end of each shaft a lever arm 115, having at the free end a roller or pin working between two horizontal flat lugs 116 (Fig. 21) on the bearing sleeve 110, which is slidable up and down on the posts 55.

These shafts 113 are supported from the bottom of frame ring 53 by two bearing bars 117 extending across the ring as shown in plan in Fig. 11 with their ends firmly bolted to the under side of said ring. The bearings for these shafts 113 are in the lower edges of the bars 117, as indicated in Figs. 10 and 22. Any oscillation of these shafts 113 will therefore move the two split rings up and down on the posts 55 equally and simultaneously. It will be noted also that this moving and equalizing mechanism for these split ring parts are at all times entirely above and out of the way of the plunger cross bar 108 and its associated parts.

Figure 2:
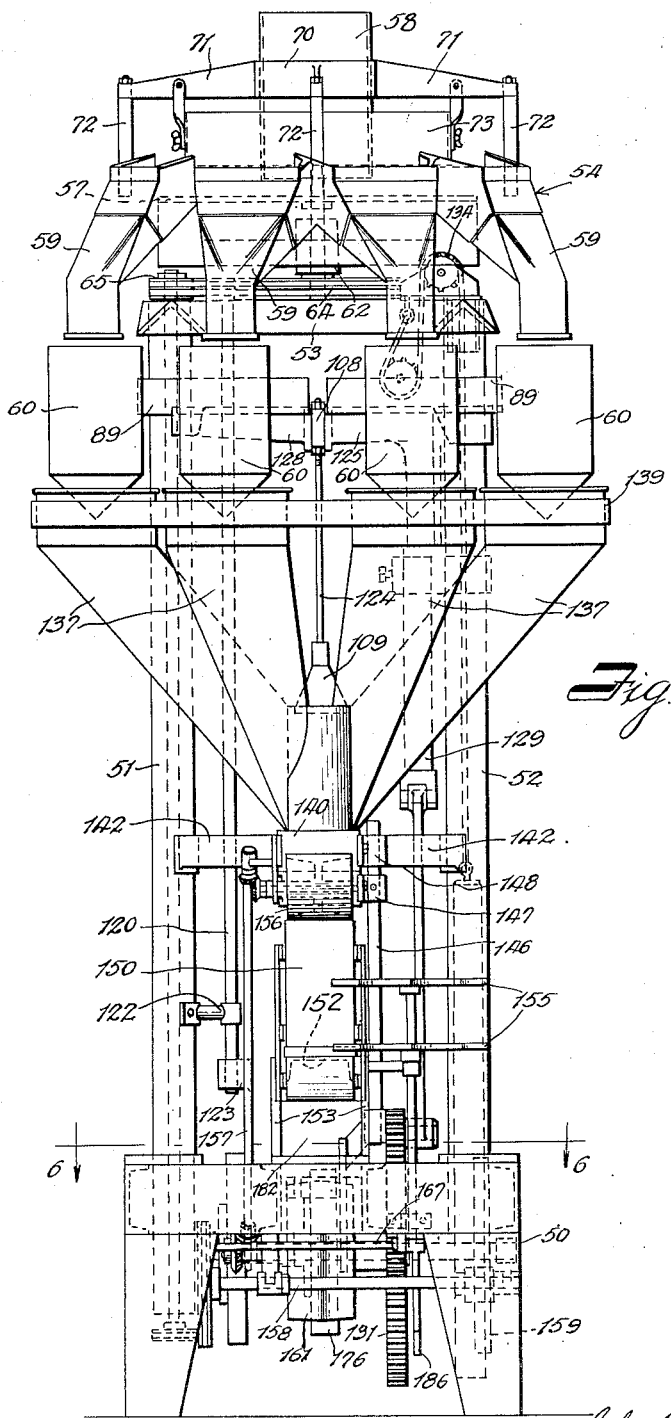
Fig. 2 is an end elevation of the machine.

In order to oscillate the shafts 113 and thereby to move this split ring vertically, a lever arm 118 (Figs. 10, 11, and 22) is secured to one of the shafts 113 and a lateral pin or roller on the free end of arm 118 engages in a horizontal slot of a casting or block 119 adjustably secured as by a set screw to the vertical rod 120. This rod 120 is vertically reciprocated by a cam in the base of the machine. Its upper end is guided by a sleeve bearing 121 formed in and as an extension of casting ring 53 at the top of the side posts. It passes through an opening in the plunger cross bar slide bearing and its lower end is guided by a bearing 122 supported by a bracket on the inner side of post 51 (Figs. 2 and 7). It is then connected by cam yoke 123, with operating cam disc on the base of the machine, as hereinafter explained. Any vertical movement therefore given the vertical shaft 120 by the cam in the base of the machine is imparted to the split ring with its control posts 88 and the corresponding lateral arms at top and bottom at the posts.

Figure 1:
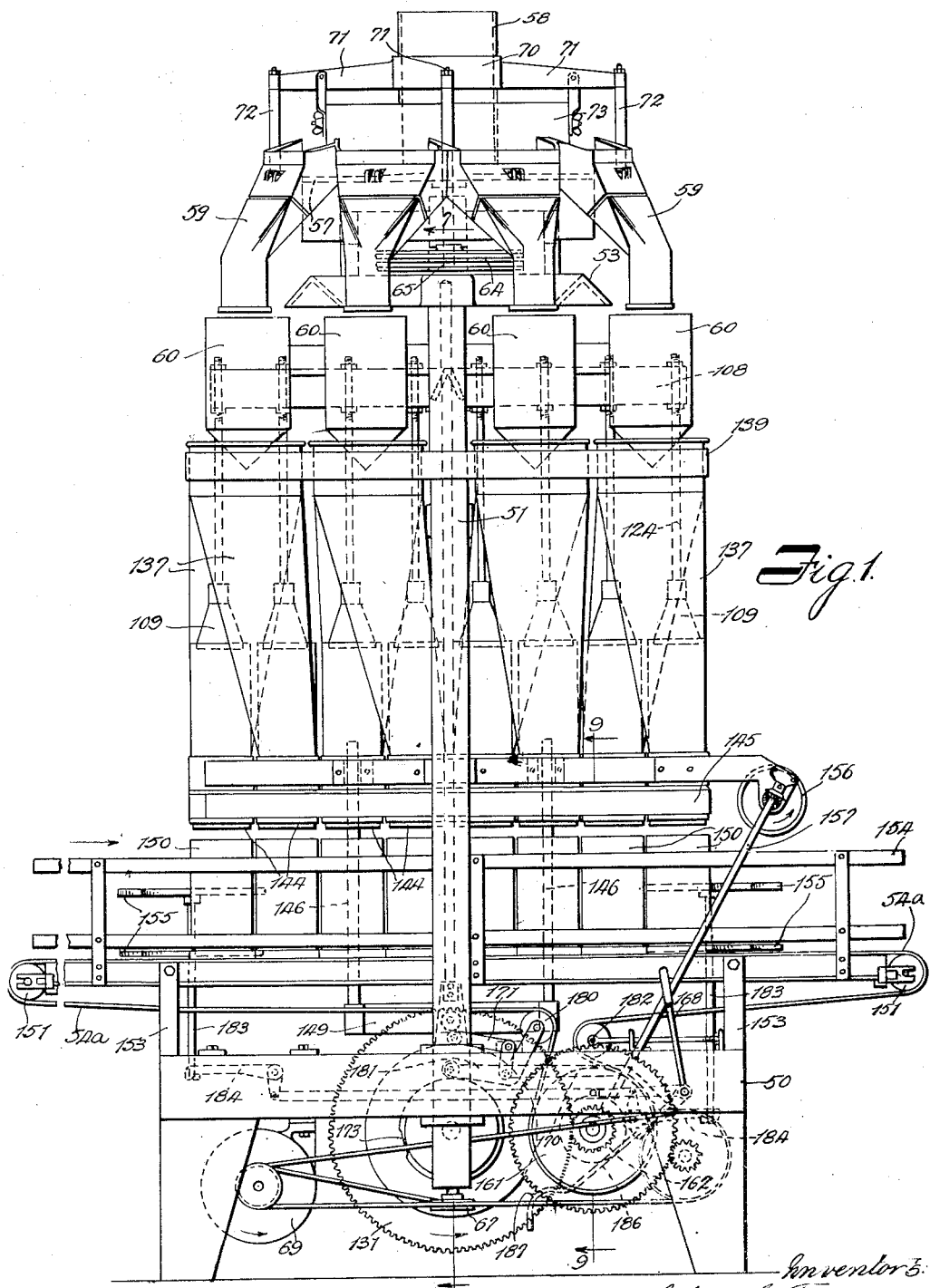
Fig. 1 is a side elevation of the machine.
Figure 3:
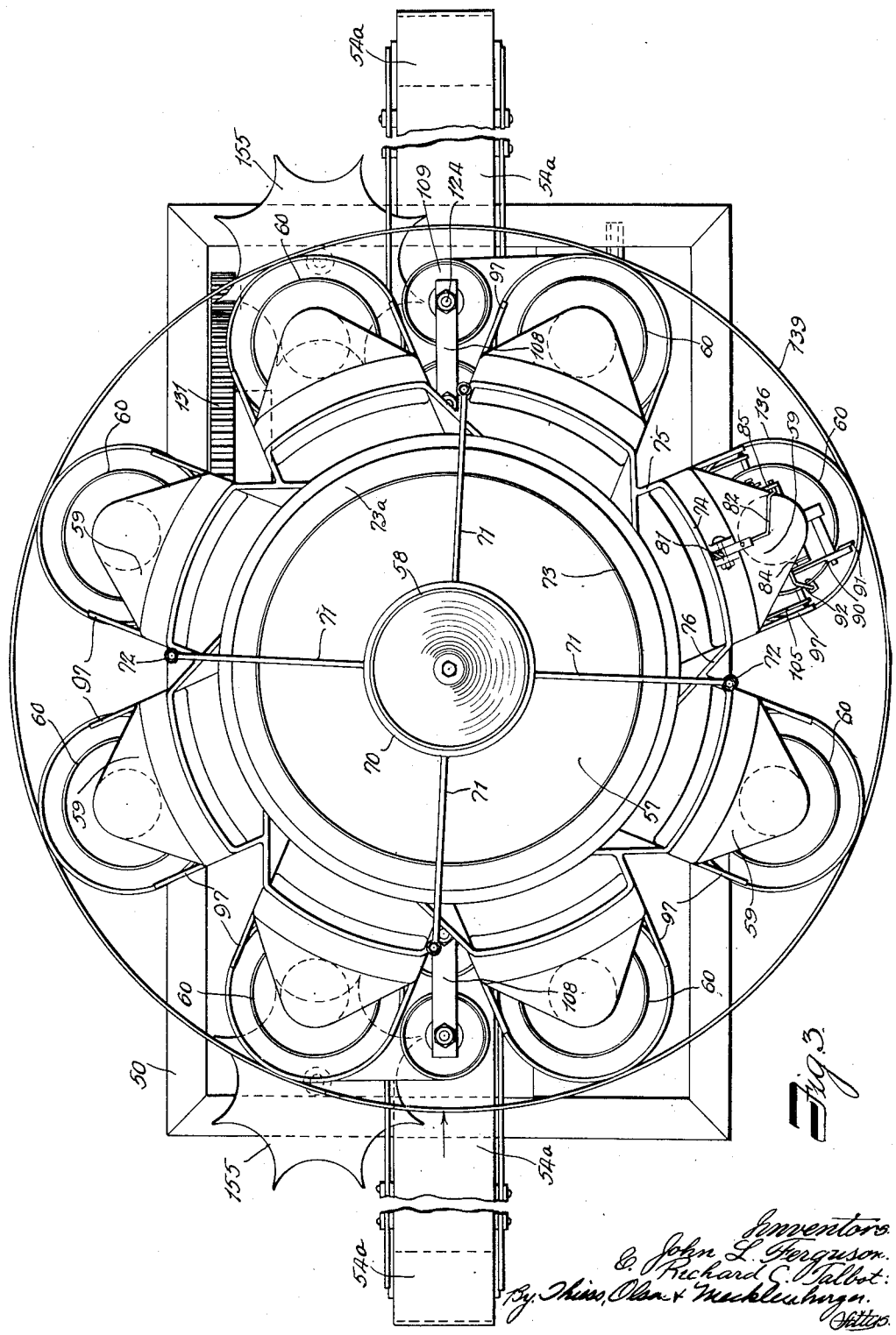
Fig. 3 is a plan view of the machine.

The horizontal plunger cross-head 108, as seen in Figs. 1, 3, and 11, extends centrally through the machine beyond the vertical limits of the ring casting 53 and the split ring 89 at the top of the machine for substantially as far as the outer limits of the weighing buckets and nearly the length of the bed of the machine. It is made this long to accommodate the plungers below which enter the containers vertically in order properly to compress and pack the product therein and to reciprocate vertically through the vertical portions of the down spouts from the weighing buckets and then through the drop spouts, all making a comparatively long vertical stroke. The plungers must be withdrawn above the streams of the product in the down spouts when the product flows into the containers, and also be able to reach down into the containers to compress the product. The plunger itself is preferably of cast iron with a fitted cast-iron cap in its lower end having an upwardly concaved face to engage the product.

Accordingly, the plungers 109 are connected by vertical rods 124 with the cross-head 108 above. This plunger cross-head may be of channel iron and the plunger rods 124 adjustably connected thereto by passing up through the laterally extending edge flanges of the channel and having a nut threaded thereon below the lower flange and another above the upper flange. Or as indicated, the cross bar may be a solid member with the rods passing edgewise therethrough and with nuts on the rods at the top and bottom of the bar, or in any other suitable manner. The cross bar is long enough to accommodate the eight vertical plungers and rods as shown.

This cross-head is mounted and supported for vertical reciprocation in a bearing member slidable up and down between the posts 51 and 52 of the frame. This member consists of two parts, a slide bearing 125 (Figs. 2, 7, 10, and 11) having in general a right-angular form, the vertical leg of which lies alongside the vertical post 52 and has two sliding bearing rings 126 and 127 surrounding the post 52.

The horizontal arm of said right-angular member engages the adjacent cross-head 108. The other member 128 on the other side of the cross-head 108 has a half ring bearing against the opposite post 51 and slidable vertically thereon. The two members 125 and 128 are firmly bolted to the cross-head 108 and to each other, as shown, so that the cross-head is firmly clamped between the two slide members 125 and 128 which are an inverted V in cross section. Fig. 11 shows these parts in plan view; Fig. 7 in vertical section with adjacent parts omitted; Fig. 10 is on a larger scale, but with adjacent parts also shown; and Fig. 2 shows the machine as a whole.

As shown in Fig. 7, a rod or central bar 129, rigidly socketed in the lower end of the vertical leg of the plunger slide bearing 125, extends downwardly alongside the post 52 and is connected at its lower end with the pitman rod 130, which is connected with a crank pin on the disc 131 in the base of the machine. By this means the plunger bearing slide 125, the plunger cross-head 108, and the plungers themselves are reciprocated up and down for the purposes described. If the material being filled does not require packing, the plungers may be disconnected or discarded or otherwise put out of commission.

A counterbalance weight for the plungers, bearing slides, etc., is provided for as follows: A sprocket bearing is located at the top of post 52. It has a cylindrical portion fitting into the upper end of the post, and a set screw or bolt may additionally secure the same in position. It has two upright side brackets between which the sprocket 132 is journaled, and a screw eye is inserted in the lower side opposite the post member. Sprocket 133 is attached to the upper side of the slide bearing 125. A sprocket chain 134 attached at one end to the said screw eye in the sprocket bearing passes down under the sprocket 133 on the plunger slide bearing and thence up over sprocket 132 at the top of post 52. From thence the chain passes down the hollow post 52, where it is attached to the counterweight 135 within the post. In this way the weight of the slide bearing castings and associated parts is effectually counterbalanced.

Sheet-metal hopper spouts for the product lead from beneath the weighing buckets to the containers, or rather, to so-called drop spouts which intervene between the lower ends of the hopper spouts and the entrances to the containers. These hopper spouts (Figs. 1, 10, 23, and 24) have large circular tops 136 immediately beneath the weighing buckets 60 and into which the buckets discharge their contents. An inclined and tapering portion 137 extends down from the upper end 136 to the vertical portion 138, which is just above the particular container to which the spout leads, and of a diameter about the same or a little less than the inside of the container.

It will be noted that these hopper spouts are not all exactly alike, due to the fact that the upper ends are positioned in a circle and their lower ends are in a straight line over the container filling position. The lower ends of the four on the one side of the longitudinal center line of the machine alternate with the four lower ends of the opposite four spouts. However, they are the same as to the tops and bottoms and as to having an inclined tapering portion between. The particular form of the latter for any special position in the machine will be readily understood and is indicated in the drawing.

When in position in the machine, the upper ends 136 of the hopper spouts are all attached by bolts, screws, or in any other desired manner to a metal band or ring 139 surrounding all of them and which assists in keeping these spouts properly positioned.

These hopper spouts are supported in the machine at and from their lower ends. Thus a cast-iron supporting sleeve 140 closely fits around the lower end of the vertical end of each spout. They fit just below the juncture of the inclined portions of the spouts with the vertical portions so that the spouts cannot slip down further through the sleeves.

These sleeves 140 are attached to horizontal bars 141 on opposite sides of the row of sleeves. The adjacent sides of the sleeves are formed with grooves or depressions into which the said bars fit as shown. Bolts through the bars and into the sleeves firmly secure them all together into a unit in a straight line, with the sleeves properly spaced to bring the ends of the spouts into filling position over the containers.

These side bars 141 are respectively secured to and supported from adjacent main frame posts 51 and 52 (Figs. 2, 5, 7, and 24) by cast-iron triangular brackets 142 extending laterally from the bars to the posts. These braces or brackets 142, as indicated, are firmly bolted at their ends to the bars and at their junctures to the posts. Accordingly, the hopper spouts are firmly held in the desired position with their upper ends in a circle under the weighing buckets and their lower ends in a straight line over the container filling position.

The drop spouts 143 (Figs. 1, 2, 7, 8, 9, and 23) are cast-iron sleeves individually fitted on the lower ends of the vertical ends 138 of the hopper spouts and slidable thereon for a short vertical distance to extend the discharge spout actually into the upper ends of the containers to be filled when the containers arrive in position therefor. For this purpose the lower edge of the drop spout has a tapered ring portion 144 adapted to enter the open end of the container just enough to hold it from lateral displacement and in proper position for filling, and then to rise sufficiently above the tops of the containers to permit the same readily to be moved out of and into filling position.

These drop spouts 143 are all secured together like the supporting sleeves 140 by side bars 145 in side grooves in the drop spouts, all being bolted together as a unit and all being raised and lowered together by a couple of vertical rods 146 secured near their upper ends, as shown, to the adjacent side bar at 147. The upper ends of said rods 146 reciprocate through guide holes in lugs 148, cast or otherwise secured on the outside of the adjacent support side bar 141 of the sleeves 140 (Figs. 2 and 24).

The lower ends of said vertical rods 146 are secured to the ends of the horizontal member 149 of the cam yoke, which, together with a suitable cam on the cam shaft and the other parts in the base of the machine, serve to move the drop spouts up and down sufficiently for their purpose. This cam yoke will be described more fully, but it may be mentioned now that, as seen in Figs. 2, 7, and 8 the part bearing the cam roller and the fork which straddles the cam shaft, is offset laterally from the horizontal part 149 joining the lower ends of rods 146.

The pack plungers 109 thus move up and down in the vertical part 138 of the down spouts, through the drop spouts 143 and into the upper part of the containers 150, the extent of the latter depending upon the material being packed and other conditions. The uppermost position of the plungers is above the flow of material through the inclined portion 137 of the hopper spout into the vertical portion, as indicated in Fig. 7 and other views of the drawings. Likewise the plunger should move into and out of the container only when the drop spout is down and engaging the container. All this is taken care of by the cams, etc., in the base of the machine as will be described later.

The containers 150 are brought into the machine and taken out again by the conveyor belt 54a heretofore mentioned. It is designed to stop when the containers are being filled so that the containers rest thereon during filling, and gradually start up again when the filling and packing have been completed, to carry the filled containers out of the machine without spilling the contents or damaging the containers. As seen in Fig. 1, the conveyor belt 54a passes over idler pulleys 151 at the very ends of the machine, the containers resting end-on-end and being carried side-by-side by the upper horizontal flight of this belt.

The lower flight of the conveyor belt is carried nearly around the driving belt wheel or pulley 161, which is continuously power operated, and over a couple of idler pulleys 180 and 182 (Fig. 1), one of which is cam operated, to tighten or loosen the belt around the drive pulley and thereby permit the belt gradually to start and stop, whereby to prevent mishandling of the containers in the starting and stopping and the filling and packing periods. This mechanism in the base of the machine will be described later. The horizontal flight of the conveyor belt is supported on the flat web of an inverted channel beam 152, seen in perspective in Fig. 5, in section in Fig. 7, in dotted section in Figs. 2 and 9, and in side edge view in other figures. The end pulleys or rollers 151 are journaled in adjustable brackets secured to the ends of this belt channel 152.

This channel 152 is raised above the surrounding table 50 of the machine by U-brackets 153 bolted to the end members of the table 50, the upper ends of the legs of the brackets 153 being bolted through spaced blocks to the edge flanges of channel 152. This gives room for the return flight of the belt above the bottom table 50 and for other parts therebetween.

Guide rails 154 for the sides of the containers are suitably supported near the tops and bottoms of the containers by vertical members riveted or otherwise suitably secured to the rails and to the edge flanges of the belt channel 152. The containers 150 readily and freely pass along this runway between the side rails 154; the runway and conveyor belt, etc., shown broken off at the left in Fig. 1, that is, at the intake end, may be as long as desired. In the particular machine depicted in the drawing, it preferably is long enough to accommodate eight empty containers to the left of the filling position for the containers.

Figure 6:
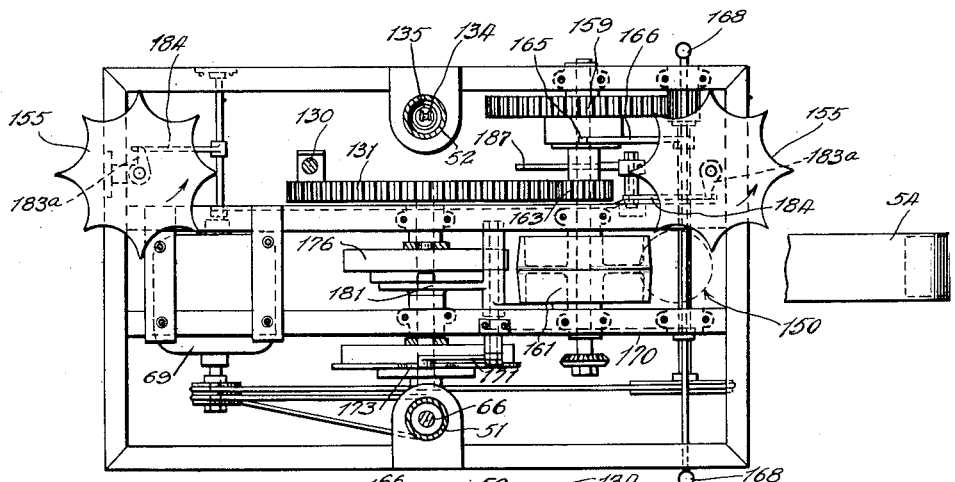
Fig. 6 is a sectional plan view of the bed of the machine, taken on the line 6—6 of Fig. 2.
Figure 5:
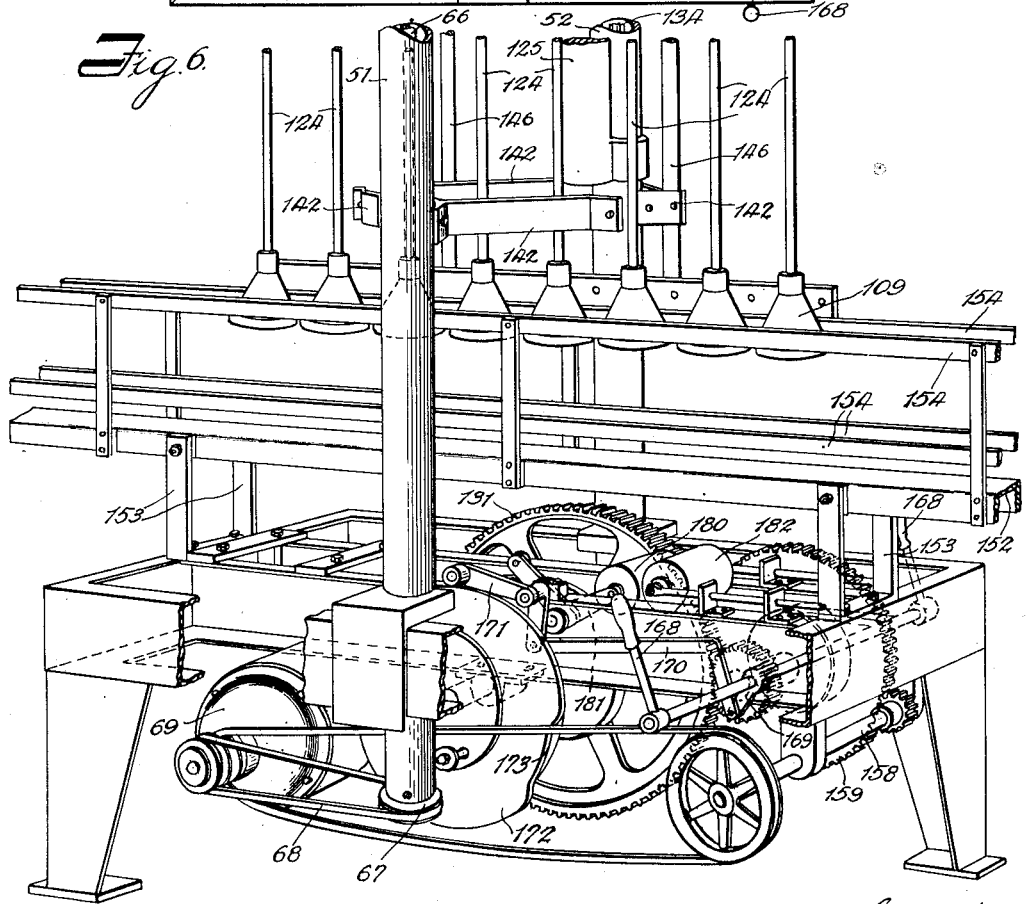
Fig. 5 is a perspective view of the lower half of the machine, from the side opposite to that of Fig. 4, showing the mechanism in the base, the conveyor frame and the lower ends of the packing plungers.

The containers are moved into and out of filling position, being carried on the belt conveyor. The belt conveyor is started and stopped properly to bring eight empty containers into filling position and at the same time to carry out from the machine the eight filled and packed containers. The conveyor belt stops for the filling and packing period, during which time the containers remain at rest upon the belt. This is all carried out in timed relation by the mechanism in the bed of the machine, but since the containers depend merely upon their frictional contact with the belt for their propulsion through the machine, and yet must be accurately positioned for filling and packing through the drop spouts, etc., suitable control star wheels 155 are provided at the entrance and at the exit of the filling position. There are two of these star wheels at each end, one above the other, on a single shaft and vertically positioned to engage the sides of the containers near the bottom and a little above the center. They, of course, are positioned at the side of the runway for the containers, and their peripheral recesses fit the curved sides of the containers, as seen in plan in Fig. 6.

There are eight of these container recesses in the periphery of each star wheel, so that one revolution of the star wheel will pass eight containers in the runway and on the conveyor belt. Furthermore, the mechanism is such (Fig. 4) that these star wheels are stopped at each revolution, but they are freed when the belt starts up. In this way the containers are accurately positioned in the filling station.

A power driven roller 156 (Fig. 1) engages the tops of the containers as they emerge from the filling and packing position to insure that the containers emerge properly from the machine even though some sort of stopping or interruption may occur in the production line after they leave this machine. This roller is driven continuously by the inclined shaft 157 from the mechanism in the base of the machine, as hereinafter explained.

In taking up the mechanism in the base of the machine from which the propulsion in proper timing relation of the foregoing elements is achieved, it will be recalled that the centrifugal feeder disc in the top of the machine is continuously rotated at constant speed by the vertical shaft down the hollow frame post 51 and a belt driven directly from the driving electric motor 69; also that the inlet and outlet gates of the control chambers 59 and the bottom gates of the weighing buckets are controlled by the rise and fall of the split ring 89, which is raised and lowered at proper times by vertical rod 120 reciprocated by a cam in the base of the machine. Likewise, the packing plungers are continuously reciprocated in their long vertical stroke through the medium of their cross-head 108, which is carried by the bearing slide 125—128, and which in turn is reciprocated by the pitman rod 130 and crank disc 131 in the base of the machine. Then, too, the drop spouts for the containers are lifted up and down a little when required to do their work by the rods 146, which are cam operated in the base, and of course there is the belt conveyor which is intermittently operated to position the containers for filling and packing, and also the exit roller 156.

Figure 4:
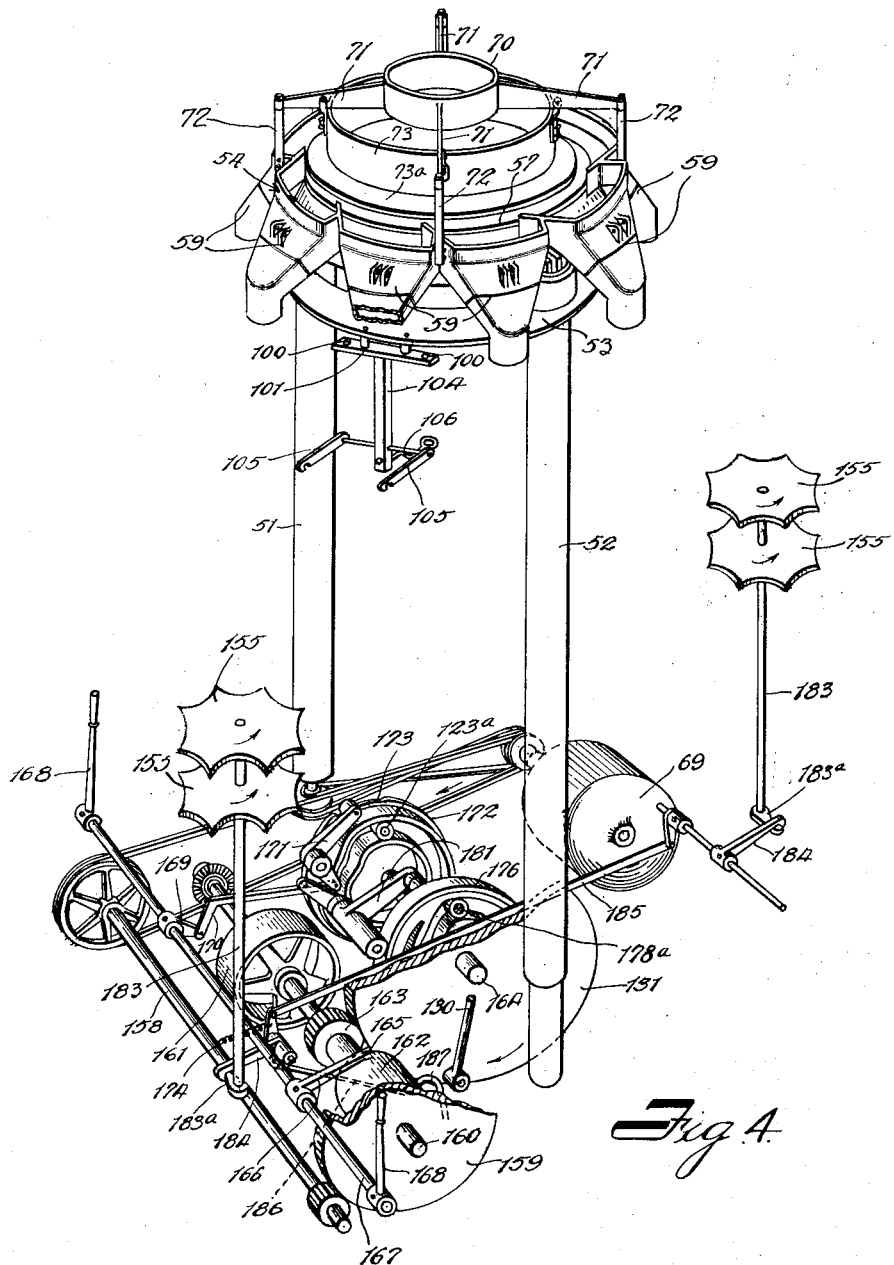
Fig. 4 is a perspective and expanded view of the machinery in the base of the machine, of the two supporting posts of the framework and some of the parts carried at the top thereof.

Referring to Fig. 4, which shows the parts somewhat in perspective and spread apart, the driving electric motor 69 is connected by a long belt with a pulley on shaft 158 at the other end of the table base. This shaft, through the small gear pinion on its opposite end, drives the larger gear 159 mounted on the driving shaft 160 which parallels shaft 158. When the motor 69 is running, therefore, shaft 158, gear 159, and shaft 160 are running also. The belt pulley 161 on this shaft is the driving pulley for the belt conveyor to carry the containers through the machine, and likewise is continuously running when the motor is turned on.

The small beveled gear at the other end of this shaft 160 drives the inclined shaft 157 which operates the exit roller 156 (Fig. 1).

A clutch 162 (Figs. 4 and 9) connects the shaft 160 and gear 159 with a sleeve on the shaft 160, which carries at its opposite end a gear pinion 163 meshing with a large gear and crank disc 131 on the main cam shaft 164 of the machine (Figs. 4 and 7).

The clutch 162, known as a dog clutch, is of that type having an inside dog or pin with a projecting lug 165, which, when engaged by the pawl or arm 166 from the outside, frees the clutch from the shaft, but when the arm or pawl 166 is lifted out and away from the lug, the clutch pin rotates and connects the clutch for rotation of the parts.

This pawl or arm 166 is mounted on shaft 167, which has a hand lever 168 on each end and at each side of the bed of the machine. By these hand levers, therefore, or either of them, the cam shaft and cams thereon can be started and stopped as desired. The construction and arrangement of these starting and stopping levers 168 and their associated parts are such that they will remain in either extreme position until manually moved therefrom.

There is one feature that may be explained here. The clutch 162 makes about six revolutions to one of the wheel 131 and of the cam shaft 164. The latter should be stopped only when, for example, the packing plungers are in the upper part of their stroke and out of the way of the other parts. But the clutch 162 could be stopped at any of its six revolutions instead of at the particular one corresponding to the upper position of the plungers, except for the feature now to be described. The hand lever shaft 167 has an arm 169 connected by bent link 170 with the lower arm of angle lever 171 journaled in a bearing on the top flange of one of the two channel bars extending longitudinally of the bed of the table. The other arm of this angle lever 171 has a cam roller adapted under certain conditions to bear on the outer rim or periphery of cam disc 172 on the cam shaft 164. This rim has a depression 173 in its cam track into which the roller drops and permits arm 166 on hand lever shaft 167 to drop into position to strike the clutch lug 165 when it comes to it in its next rotation and thereby to throw out the clutch.

This occurs when the plungers are in the upper part of their stroke, but at other times if the hand lever has been moved to stop the machine, the cam roller or lever 171 rides on the other and raised part of the periphery of the cam disc 172 and prevents the arm or dog 166 on shaft 167 from dropping into the path of the clutch lug. Also, when the hand lever is pulled entirely back to free the dog 166 from the clutch, as for instance at the beginning of the run of the machine for any extended time, the cam roller on arm 171 is lifted entirely free from the periphery of cam 172 at all points, and the machine, therefore, continues to operate until the hand lever has been moved and the disc reaches the proper position for stopping.

Accordingly, after the machine has been started by pulling the hand lever 168 in an outward direction, the cam shaft 164 and the cams thereon continue to rotate, as well as shafts 158 and 160 and conveyor belt drive pulley 161.

Referring to Fig. 7, the cam recess or groove in the face of the cam disc at the left hand of the cam shaft 164 operates the split ring in the top of the machine through the cam roller 123a and cam yoke 123 and vertical rod 120. This is the same cam disc, the periphery of which has the safety stop depression 173 for the clutch 162.

Figs. 16 and 17 show the two faces of this cam disc, the peripheral depression 173 being shown at the top of the disc, and the split ring cam groove 175 being shown in Fig. 16. The cam yoke 123 (Fig. 7) has a fork at the lower end straddling the cam shaft 164. A roller 123a engages the cam groove 175, and its upper end is secured to the lower end of the rod 120. By this means the cam yoke on cam rod 120 is caused to move vertically in accordance with the radial variations of the distance of the cam groove from the center of the disc.

The drop spouts are raised and lowered by cam 176 on the cam shaft 164, a groove 177 (Fig. 14) being formed on one face thereof in which a roller 178a runs that is secured to the side of the offset cam yoke 178 (Fig. 7). This cam yoke has a fork at its lower end straddling the shaft 164 and a laterally offset portion above the cam roller extending to the horizontal bar 149 (Fig. 8) to which the vertical rods 146 are secured. The latter are connected to the drop spouts as indicated in Fig. 7.

The reason for the lateral offset in the cam yoke 178 is apparent from Fig. 7, that is to enable it to free adjacent parts above and below, and fit into the mechanism.

This cam disc 176 (Fig. 15) has on the opposite face another cam track 179 which operates the conveyor belt tighting and loosening pulley 180 (Fig. 1). This pulley 180 is carried on an arm or bell crank lever 181, the other arm of which carries a cam roller engaging the cam track 179 (Figs. 1, 4, 5, 9 and 15). Thus, when the cam roller engages the high point of track 179 on cam disc 176 the pivoted idler roller 180 is swung over to tighten the conveyor belt around the conveyor drive pulley 161 and thus to start up the belt gradually, and when the cam roller again passes to the lower part of the track, the belt gradually comes to a stop by the loosening of the idler pulley. This, of course, occurs but once in the revolution of the cam shaft and causes the belt to shift the empty containers into position and the filled containers out and to remain quiescent with the containers resting thereon during the filling and packing. The conveyor belt also passes over another idler pulley 182, which may be adjusted to vary the belt tension. These idler pulleys cause the conveyor belt to pass nearly around the entire circumference of the drive pulley.

On the same cam shaft 164 the large gear wheel 131 is secured and drives it. The wheel itself is driven by the gear pinion 163. This wheel or disc 131 is also the crank disc for the operation of pitman rod 130, which reciprocates the packing plungers.

The star wheels 155 are mounted at the upper ends of two vertical shafts 183 suitably journaled to bars secured to the framework of the machine, as indicated, at their lower ends. A lateral arm 183a on each is adapted to be engaged by a hook 184 to stop the rotation of the shafts and star wheels. This occurs when the containers are all in their filling position. These hooks 184 are simultaneously raised to free the star wheels by link bar 185 connecting them. Link bar 185 is connected at each end with an arm on the pivot of the hook or is connected therewith, so that movement of the link in one direction will raise the hooks to release the star wheels and a movement in the other direction closes them or restores them to the path of the arms on the star wheel shafts. These hooks are automatically raised in timed relation with the other parts. Rod 186 (Figs. 4 and 8) has its one end secured to the hook 184 at the adjacent end of the machine and its other end humped or upwardly bowed as at 187 and standing in the path of movement of the crank pin on gear 131, or rather the lower end of pitman rod 130, which is journaled on said pin. When, in the rotation of this wheel 131, the end of pitman rod 130 strikes said upwardly bowed portion of lever arm 186, the latter is depressed and the hooks are raised and the star wheels are free for rotation. The hooks are then lowered again under the influence of tension spring 174 to engage the arms 183a on the star wheel shafts to stop the same at the end of a complete revolution.

The bed frame of the machine includes two longitudinal channel iron members secured therein, and the various shafts and other parts mentioned are suitably secured thereto and to the frame as indicated in the drawings. A removable sheet metal cover 188, in two like parts, having top, ends and a side each, covers and encloses the mechanism on each side of the bottom channel of the conveyor, to protect the mechanism in the base from dust and dirt from above and contact therewith.

In operation, the product to be filled and packed is fed by gravity from hopper or storage bin through the feeding pipe 58 at the top center of the machine onto the centrifugal feeder disc 57. This disc is rapidly and continuously rotated; has a smooth upper surface which is substantially flat except for the conical projection in the center; is horizontal; and the product is thereby uniformly distributed towards its periphery without the usual stirrers or similar devices tending to break up the fragile flakes of the material.

While the feeder disc in the particular machine shown, which is used to weigh and fill 3-lb. containers with rolled oats—a fragile flake material—at a rate of 80 containers per minute, is about 24 inches in diameter and operates at a speed of about 300 R. P. M., such factors may and do vary with the amount and nature of the production called for, the kind of material to be handled, and other conditions. For example, in other weighing and filling machines using such feeder disc successfully for handling finely ground corn meal, grits and barley in 1½ lb. packages at 80 per minute, the feeder disc is approximately 8 inches in diameter and operates at approximately 860 R. P. M. In these machines, too, the conical projection in the center of the disc is sharp-pointed as such products require practically no agitation. The pointed conical projection is deemed advantageous for products requiring no agitation, whereas the flat top conical connection is deemed advantageous for non-free flowing products. With the pointed projection its base may be smaller in diameter than it would be if its top were flat. This permits the use of a smaller diameter supply pipe, which may be advantageous for handling some products and especially when the predetermined diameter of the disc is comparatively small. In these other machines the sharp point of the cone extends further up into the supply pipe, and its base is nearly the width of the supply pipe, which is 4 inches in diameter. In the present machine, the supply pipe is 8 inches in diameter, and the slightly blunt end of the conical projection on the disc affords sufficient agitation of the product without damage thereto. The base of the cone is flared out—bell-like—to merge with the flat surface of the disc.

The conical projection on the flat disc causes the product to be deflected outwardly for free and uniform distribution, prevents a dead weight of the product directly under the supply pipe which would tend to cause a churning effect and mutilation of delicate products, is self-cleaning when finishing a run, thereby preventing opportunity for germ infestation of food products, and, together with the bottom of the supply pipe, which is adjustable in height above the disc, affords a close control over the flow of the product onto the disc to insure a uniform delivery therefrom at the periphery.

The flat top of the disc acts as a continuous conveyor without obstructions, which assures uniform delivery of the product. Its size depends, among other things, on the predetermined delivery points of product from the disc. The nature and quantity of the product to be delivered in a given period of time may determine the desirable size of supply pipe and operating speed of the disc.

At the periphery of the disc the product is forced by centrifugal action into the control chambers 59 which open equally around the disc, if their control gates are open.

The flange 73a of the sheet metal ring 73 above the disc prevents the product piling up too high at the inlet gates of the control chambers and both this and the feed pipe 58 are adjustable in height for control of the feeding and handling of the product. It would not interfere with the proper operation of the machine if the product did pile up to some extent at the inlet gates, since as soon as such gates were opened the mass would be thrown into the control chambers and normal conditions on the disc and through the control chambers would soon be established so that accuracy of weighing would be maintained. This in a way would be akin to the so-called bulk-and-dribble weighing, that is, a large flow obtained in any desired way until about time to close the outlet gate, when a small flow is established for accuracy in weighing, as is well understood.

At the point in its travel when the product arrives on the disc in a single large stream, it is divided into a plurality of uniform streams, in this instance eight, at the periphery of the disc, and from there on travels separately through the machine and into separate containers, eight containers being filled, packed and delivered simultaneously at each cycle.

In the other machines referred to there were but six subdivisions of the stream of the material at the periphery of the disc. Owing to the nature of the product, these were smaller, the control chambers and weighing buckets were smaller, and the ultimate containers were small. Accordingly, the centrifugal disc could be and was smaller.

In the present machine, the control chambers, which receive the material direct from the periphery of the disc, and the respective weighing buckets are in vertical radial planes of the machine. This arrangement, however, is not necessary. There may be but a single weighing unit, a multiple of weighing units in a straight line, or a number of weighing units in each of two parallel lines, or any desired arrangement, the product being diverted from the feeder disc to the control chambers through suitable connecting spouts or otherwise. For instance, in the other machines referred to there were two parallel straight lines of three weighing units each. The control chambers led from the periphery of the disc through inclined spouts to the weighing buckets. The filling station of the six containers being simultaneously filled, was in a straight line below the weighing buckets, and they were connected by inclined spouts therewith. Owing to the nature of the product in these other machines, no packing plungers were employed. Nor was it necessary to use a flanged ring above the feeder disc.

As stated, the weighing buckets 60 in this machine are located below the control chambers 59. With the gates of the control chambers open, the weighing buckets are filled and automatically move down a little under the weight of the product. This downward movement closes the control gates above so that no more of the product can flow through into the bucket.

When all the buckets have been filled, the gates or bottom members forming the bottoms of the buckets are opened by the lateral arms carried on the lower ends of posts 88 on the split ring 89 which is caused to descend by the vertical rod 120 and cam disc 172 in the base of the machine.

This discharges the product in the buckets into the upper ends of hopper spouts 137, which finds its way into the containers, the drop spouts meanwhile having been lowered over the containers by cam disc 176 in the base of the machine.

As soon as the product reaches the containers, the packing plungers descend upon it through the lower vertical portion of the hopper spouts, through the drop spouts and into the upper parts of the containers.

This suitably packs the product in the containers, the plungers being operated through their rather long stroke by the crank disc 131 on the cam shaft in the bed of the machine.

When the plungers start back up by the rotation of the crank disc 131, several things happen. The drop spouts raise to free the containers by cam track 177 (Fig. 7) on cam 176; the conveyor belt gradually starts up by the effect of cam shoulder 179 on cam disc 176 in pushing the idler roller 180 into the belt and therefore tightening it around the continuously rotating belt drive pulley 161; and the star wheels 155 are freed for rotation by the striking of the end of pitman rod 130 of crank disc 131 against the end of the lever arm 186 and the consequent lifting of the hooks 184 at the lower end of each star wheel shaft 183.

Thus the eight containers with the filled and packed product in them are moved out of the machine, this being insured by continuously driven roller 156, and eight empty containers are brought in at the same time for the next group.

In the foregoing "operation" it has been sought to follow the product through the machine in its successive steps. The cycle, however, of turning out groups of completed containers is not so long since some of these steps overlap. The centrifugal feeding disc, for example, operates continuously and is therefore always ready to deliver the product into the control chambers instantly upon the opening of the inlet gates thereof. Also as soon as the weighing buckets are discharged of their contents their refill begins for the weighing for the next set of containers.

This latter is done by the lateral arms at the bottom and top of posts 88 carried by the split ring. The cam groove 115 on cam disc 172 in the bed of the machine starts the split ring up and permits the bottom doors in the buckets to close immediately by their spring hinges. As the posts 88 continue to rise to their extreme height, the gates of the control chamber are opened and latched in open position. The product then pours into the weighing buckets, which are soon filled and weighed. In the latter movement they descend slightly, but enough to unlatch and close the control chamber gates.

The buckets then remain in this position until they are again discharged into the next batch of containers. Thus, this refill of the buckets takes place while their previous load is being taken care of in the filling, packing and removal of the containers and bringing in of an empty set.

Of course the supplying of the empty containers and the removal from the machine of the filled containers, whether done by hand or by automatic mechanism, is not a part of this invention and therefore not shown or described. Usually, however, the machine is placed in a production line where the containers are fed automatically to and from the machine by suitable conveyors. The adjustments necessary to adapt the machine to different containers and products are obvious and may be carried out by those skilled in the art.

It will be apparent that the invention may be varied in its physical embodiment without departing from the spirit of the invention, and it is desired, therefore, that the invention be limited only by the scope of the appended claims.

Having thus described the invention, what is claimed and desired to be secured by Letters Patent is:

1. A machine for weighing and filling containers with particulated material or product, comprising a vertical supply pipe at the top of the machine, a horizontal feeder disc beneath the supply pipe to receive the material centrally therefrom, said disc being relatively much larger in diameter than the supply pipe, the supply pipe being adjustable to and from the disc to control the supply of material thereto, the feeder disc having a smooth and flat upper surface, means for rapidly rotating said feeder disc to cause the material to spread over its face by centrifugal force and to travel to its edge, depending control chambers having their opening upper ends around the edge of the disc to receive the material from the disc, inlet and outlet control gates for and at the ends of said control chambers, said inlet gates forming when closed a peripheral dam for the disc, weighing buckets suspended immediately beneath the lower ends of the control chambers, the closure of the outlet gates being responsive to a predetermined weight of material in the buckets, and hopper spouts leading down from the buckets and terminating in a straight line container-filling position.

2. In a machine of the class described, a single rapidly rotating feeder table disc onto which the material is centrally fed and over which it evenly spreads in a thin layer to be thrown off at the edge of the disc by centrifugal action into suitable receiving openings, material receiving means having openings at the periphery of the disc and dividing the discharge into a plurality of streams, additional means positioned below said material receiving means, said material receiving means and said additional means forming a substantially continuous tube-like structure to conduct the streams individually through the machine to preselected individual receptacles, control gates at said edge and openings, and a ring-like member supported over the disc on the inner side of the gates to limit the height to which the material may pile up at the edge of the disc when the said openings are closed or do not carry the material away rapidly enough.

3. In a machine of the class described, a single rapidly rotating feeder table disc, means for feeding the material to the center of the disc only, a housing for the disc having openings at the edge of the disc to receive the material therefrom, control gates for said openings and at the periphery of the disc, a flanged ring member adjustably supported above the disc within the gates and with its flange extending horizontally and adjacent the openings and serving to limit the height to which the material may pile up on the disc at the openings, and the ring part of said member being nearly as large in diameter as the disc and of a height above the flange of more than the height of the flange above the disc, whereby sufficient room for the excess material to pile up in the ring is provided while the depth at the ring openings remains limited.

4. In a machine of the class described, a rapidly rotatable feeder table-disc at the top of the machine, a supply pipe for feeding the material centrally onto the table, a feeder housing ring surrounding the disc and having openings at the edge thereof to receive the material thrown off by centrifugal force, a vertical shaft supported by the ring for supporting and rotating the disc, supporting posts one of which is hollow on the base of the machine for carrying at their upper ends the top part of the machine, a shaft extending through said hollow post, a driving connection from the top thereof above the post to the shaft of the feeder disc, and means in the base of the machine for driving said shaft in the post.

5. In an automatic weighing and container-filling machine, a relatively large rapidly rotating centrifugal feeder table or disc, means for depositing the material to be weighed centrally on the table, depending control chambers having their openings around the periphery or edge of the table, inlet and outlet gates for each said control chamber, the inlet gates when closed forming a circumferential vertical guard ring for the disc, weighing buckets closely below the lower ends of the control chambers and outlet gates, bottom outlet gates in the buckets, machine power operated control mechanism for opening the bucket gates and the control gates, means responsive to a predetermined weight of material in the individual buckets for closing the outlet gate of the corresponding control chamber, and hopper spouts leading from the weighing buckets to a container-filling position, said power operated control mechanism serving to open the bottom gates of the buckets to discharge the buckets, then to permit closing of the same and to open the gates of the control chambers and to leave the outlet gates under control of the buckets for individual closing.

6. In a machine of the class described, a vertically reciprocating horizontal cross-head, packing plungers secured thereto, a split ring also vertically reciprocable and carrying gate control means, the said ring being split to permit the cross-head in its movement to pass therethrough, and operating mechanism above the upper end of movement of the cross-head and connecting said ring parts together to cause the same to reciprocate as one.

7. In a machine of the class described, a bed having a multiple container-filling position in a straight line, packing plungers thereabove, one for each container, a horizontal cross-head extending lengthwise over the filling position, said plungers being attached to said cross-head, supporting posts of the machine on either side of said filling position, a vertically sliding bearing member between the posts and secured to said cross-head, a counterweight inside one of said posts for said sliding member and attached parts and connected therewith by a flexible connection, and driving mechanism in the base of the machine for sliding said member up and down the posts to operate said plungers.

8. A method of subdividing a mass of particulated material into a multiplicity of small individual streams for ultimate packaging which comprises confining the mass to provide it with a surface of revolution having a vertical axis, subjecting the lower portion of the mass to frictional rotational forces substantially coaxial with said vertical axis to cause centrifugal forces to act on said mass to move the particles outwardly away from said axis, dividing the mass of outwardly moving particles into a multiplicity of relatively small streams at points circumferentially spaced about said axis, maintaining the individuality of said streams below said circumferential points and preserving the individuality of said streams to their ultimate packaging destinations.

9. A method of subdividing a solid mass of particulated material which comprises causing the mass to move downwardly by gravity, confining the mass laterally to a circular horizontal cross section, subjecting the lower portion of the downwardly moving mass to frictional rotational forces substantially coaxially with the axis of said circular outline to cause centrifugal forces to act on said mass to move the particles outwardly away from said axis, dividing the mass of outwardly moving particles at points circumferentially spaced about said axis into a multiplicity of small streams and preserving intact the individuality of said streams beyond the said circumferential points and directing them individually to their ultimate packaging destinations.

10. A machine for feeding particulated material for ultimate packaging comprising a single horizontal rapidly rotating centrifugal feeder disc, a feed pipe, means for feeding the material directly from said pipe onto the disc and only centrally thereof, means at the periphery of the disc for dividing the material into a plurality of individual streams, means for individually receiving the said divided streams of material from the periphery of the disc, control gates at the periphery of the disc to control the feed to each of the receiving means, said gates being carried by the machine independently of the disc, ultimate packaging means for each of said streams to which said receiving means respectively lead, and means below said individual receiving means for preserving the individuality of said streams during packaging.

11. A machine for feeding particulated material for ultimate packaging comprising a single rapidly rotating horizontal centrifugal feeder disc, a feed pipe, means for feeding the material directly and in bulk from said pipe onto the center solely of said disc, means for distributing the material in a plurality of individual streams from the periphery of said disc, control gates at said periphery to control the feed of said streams, said gates being carried by the machine independently of the disc means for maintaining the individual streams intact beyond the said periphery, and ultimate packaging means to which said streams respectively lead.

12. In a mechanism for feeding particulated material for ultimate packaging from a bulk supply to containers or the like, a single horizontal feeder disc, a feed pipe, means for feeding the material directly from said pipe onto the disc and centrally only thereof, means for rotating said disc to cause the said material by centrifugal force to travel toward and be discharged from the periphery of said disc, means at the periphery of the disc for dividing said discharged material into a plurality of individual streams, a plurality of receivers at the periphery of the disc one for each of said streams to receive the said material, said receivers maintaining the individuality of said streams and conducting them to the containers or the like, and control gates at said periphery to control the flow of material to said receivers, said gates being carried by the mechanism independently of the disc.

13. A machine for feeding particulated material for ultimate packaging comprising a single horizontal feeder disc, a feed pipe, means for feeding the material directly from said pipe to and centrally solely of the disc, means for rotating the disc suitably to cause the material by centrifugal force to spread over its face and travel toward the periphery, means for dividing the material into separate small streams at said periphery and causing said streams to travel in a plurality of separate paths beyond the periphery of the disc for ultimate packaging, and control gates at the periphery of the disc for said paths, said gates being carried by the machine independently of the disc.

14. A machine for feeding particulated material comprising a single-stage horizontal feeder disc, means for feeding the material to and centrally of the disc, means for rotating the disc suitably to cause the material by centrifugal force to spread over its face and travel to the periphery, means for dividing the flow of material from the periphery into a plurality of streams, an outlet gate for each stream at the periphery, a chamber for each stream into which it discharges, said peripheral gate forming also the inlet gate of the said chamber, and means for controlling the discharge of the material from said chamber.

15. Container-filling apparatus for handling particulated materials comprising a central feed pipe and continuously rapidly rotatable horizontal smooth-faced feed table having a circular delivery edge extending substantially beyond the feed pipe, on which table the material to be handled is centrally fed by said feed pipe and over the face and edge of which the material travels by centrifugal force, depending control chutes about the edge of said table to receive the material from said delivery edge, a weighing container beneath each chute to receive the material as it is delivered from said chute, individual cut-off gates for each chute, and connections between the containers and gates operated by the weight of the material in the weighing container for stopping the delivery of material from said table to said chute.

16. Container-filling apparatus for handling particulated materials comprising a central feed pipe, a continuously rapidly rotatable substantially flat smooth-faced feed table extending substantially beyond the feed pipe and having a circular delivery edge, on which table the material to be handled is placed and over the exposed face and edge of which the material is fed by centrifugal force, a plurality of control chutes substantially in the path of the material as it leaves and falls from said delivery edge, a weighing container at the lower end of each chute to which the material is delivered from said chute, and cut-off means connected with the containers and operated by the weight of the material in the weighing containers for individually stopping the delivery of material from each said chute and for stopping the delivery of material from said table to each said chute.

17. Container-filling apparatus for handling particulated materials comprising a continuously rapidly rotatable substantially flat smooth-faced feed table having a circular delivery edge, a pipe to feed the material centrally of the table and on which table the material to be handled is placed and over the flat face and edge of which the material is fed by centrifugal force, control chutes surrounding the table to receive the material as it leaves and is delivered from said delivery edge, gates at the edge of said table and at the entrances to the chutes, a weighing container at the lower end of each chute to which the material is delivered directly from said chute, and a cut-off gate for the chute, and means connecting said gates and containers controlled by the weight of the material in the weighing container for stopping the delivery of material to and from said chutes.

18. Container-filling apparatus for handling particulated materials comprising a continuously rapidly rotatable substantially flat smooth-faced feed table having an extended exposed face and a circular delivery edge, a pipe for feeding the material centrally of the table and on which table the material to be handled is fed over the face and edge by centrifugal force, gates surrounding said edge, control chutes to which the material is delivered directly from said delivery edge when the gates are open, a weighing container for each chute into which the material falls directly from said chute, and cut-off gates for said chutes connected with the containers, the gates of each chute being controlled by the weight of the material in the weighing containers of the respective chutes for stopping the delivery of material from said table to said chutes and from the chutes to the weighing containers, and means for discharging the weighing containers.

19. Container-filling apparatus for handling particulated materials comprising a continuously rapidly rotatable horizontal smooth-faced feed table having an extended and exposed face and a circular delivery edge, on which table the material to be handled is centrally placed and over the face and edge of which the material is fed by centrifugal force, chutes suspended adjacent the disc edge to which the material is delivered from said delivery edge to eventuate a plurality of individual small streams, which streams are thereafter maintained individually intact until they are individually disposed of, a weighing container for each chute to which the material is delivered directly from said chutes, one of said streams being delivered into each of said chutes thereby thus to maintain the material in each of said streams separate from the material in the other streams until each stream is individually delivered to its ultimate destination, cut-off means connected with the containers controlled by the weight of the material in the respective weighing containers for stopping the delivery of material thereto from said chutes and for controlling the delivery of material from said table to said chutes, and means for discharging the containers.

20. In an automatic weighing and filling machine, a relatively large, rapidly and continuously rotating feeder table or disc, means for depositing the material to be weighed centrally on the table, the material feeding over the periphery of the disc by centrifugal action, depending control chambers having their openings around the periphery or edge of the table, control inlet and outlet gates for each said control chamber, the inlet gates when closed forming a peripheral guard ring for the disc, weighing buckets closely below the lower ends of the control chambers and outlet gates, bottom outlet gates in the buckets, a ring inside the circle of buckets and adjacent thereto, control arms carried by said ring, means to vertically reciprocate said ring and arms in timed relation with the desired sequence of operation of the machine; and said arms being engageable when vertically reciprocated with the control and bucket gates to open the latter in one direction of its movement and to open the control gates on its movement in the other direction, means connecting the weighing buckets with the control gate mechanism for individually closing said control gates upon the buckets' receiving a predetermined weight of material, and hopper spouts leading from the buckets to container-filling position.

21. In a machine of the class described, a ring of weighing buckets to receive the material to be weighed, a correspondingly arranged set of control chambers one for each bucket, said control chambers having each a control inlet and an outlet gate, means connecting the respective buckets with the control gates of their respective control chambers to close the gates upon descent of the buckets in weighing, the buckets also having outlet gates, hopper spouts leading from the buckets to the container-filling position, a control ring inside the circle of buckets but adjacent thereto, vertical posts carried by the ring adjacent each bucket and control chamber, lateral upper and lower arms on the posts, the upper arm of each post lying adjacent the outlet gate of the corresponding control chamber and means connecting it therewith to open the control gates upon motion in one direction and the lower arm adjacent the bottom gates of the bucket, means for connecting said lower arm with the bucket gates to open the latter by movement in the opposite direction, said ring being vertically slidable in the machine, and power means operated from the base of the machine to reciprocate said ring properly to operate said gates repeatedly to fill and empty the said buckets in timed relation with the sequence of operation of the machine.

22. In a weighing machine, a plurality of weighing buckets, a control gate for each bucket of the product to be weighed thereby, means to close said gate by the descent of the bucket in normal weighing, a downwardly moving part for each bucket to engage the bucket in its lower position to discharge its contents, a common support for all said downwardly moving parts and for operating them simultaneously, each said part when descending also engaging and causing the descent of its bucket and the closure of its control gate if for any reason any of the buckets has not descended in weighing, and means to cause the descent of said common support.

23. In a weighing and filling machine, a plurality of weighing buckets arranged in a circle, control chambers one for each bucket, control gates for the chambers, means interconnecting the buckets and the control gates to effect the closing of the gates upon the descent of the buckets, said means comprising a vertically movable ring inside the circle of buckets and having members for engaging and forcibly causing the descent of any bucket and the closing of the corresponding control gate by the bucket in case that bucket has not descended in the normal weighing operation.

24. In a machine of the class described, a relatively large rapidly rotating centrifugal circular feeder disc, a feed pipe at the center of the disc, the material spreading over the disc by centrifugal action and falling over the outer edge thereof, means at said outer disc edge to form a plurality of individual small streams of said material, which streams are thereafter maintained individually intact until they are individually disposed of, depending control chambers in a circle with their openings at the edge of the disc, a supporting ring comparable to the size of the disc and located a substantial space therebeneath, weighing buckets closely beneath the ends of the control chambers one of said streams being delivered into each of said buckets thereby thus to maintain the material in each of said streams separate from the material in the other streams until each stream is individually delivered to its ultimate destination, means controlled by the buckets for stopping the flow of fed material from the control chambers when the buckets make their weights, scale beams pivotally supported from said ring and extending radially and horizontally therefrom, said weighing buckets being suspended from said scale beams, the buckets being vertically outside the ring, and balancing weights on the inner ends of the scale beams and inside the ring and beneath the said disc.

25. A container-weighing and filling machine comprising a plurality of weighing buckets in circular formation in the path of flow of streams from a relatively large circular feeder of the material to be weighed and filled in containers located along straight lines beneath and across the circle of the buckets, divergent descending inclined spouts from the buckets to the containers to conduct the weighed material from the buckets to the containers, the lower end portions of the spouts being vertical and along straight lines over the containers, packing plungers reciprocating in said vertical portions, cross-head means for carrying said plungers, the cross-head means and plungers being located and operating in the space surrounded by the divergent spouts and weighing buckets.

26. A mechanism for feeding particulated material comprising a single-stage horizontally disposed smooth-face flat-top centrifugal feeder disc, a material feed pipe terminating centrally over said disc and spaced therefrom, said disc having a cone-like central projection on its upper face extending up into the stream of material from said feed pipe and tending to spread the material out evenly over the disc, the disc extending outwardly substantially beyond the flow of the material thereon from the feed pipe due to gravity and the angle of repose of the material, means for rapidly rotating said disc on a central vertical axis to cause the material by centrifugal force to spread and travel over the face of the disc including said extending portion and to discharge over its periphery, material receiving means having openings at the periphery of the disc and dividing the discharge into a plurality of streams, additional means positioned below said material receiving means and said additional means forming a substantially continuous tube-like structure to conduct the streams individually through the machine to preselected individual receptacles.

27. The method of force-feeding particulated material in a uniform stream for the accurate weighing of retail merchandising containers thereof which consists in subjecting a downward solid stream of the material to the transverse centrifugal action of a larger rapidly rotating smooth-faced disc and controlling the rate of feed of the material to the disc and the speed of rotation of the disc to produce a uniform sheet-like discharge of the material at the periphery of the disc, dividing said sheet of material at the periphery of the disc into a multiplicity of continuing individual streams, and filling said individual streams into containers and weighing said containers.

28. The method of force-feeding particulated material in a plurality of uniform streams for the accurate weighing of said material into retail merchandising containers which consists in controllably feeding a solid stream of the material centrally to a relatively large smooth-faced rapidly rotating horizontal disc and imparting to said material an outward uniform movement toward the periphery of the disc by the frictional centrifugal action of the disc thereon, dividing said material into a plurality of individual streams at the periphery of the disc, maintaining the individuality of said streams, and weighing and filling each stream into an individual merchandising container.

29. In a machine of the class described, the combination with a circular feed disc for particulated material, of control chambers in ring formation about said circular feed disc, stationarily located, control gates for said chambers to control the flow of material from said circular feed disc through said chambers, a horizontal vertically reciprocating ring, and control gate operating means carried by said ring and operated by the reciprocation thereof in the control of said gates.

30. In a machine of the class described, the combination with a circular feed for particulated material, of control chambers in ring formation about said circular feed, control gates for said chambers to control the flow of material from said circular feed through said chambers, a horizontal vertically reciprocating ring, control gate operating means carried by said ring and operated by the reciprocation thereof in the control of said gates, said ring being split into two halves spaced apart at their ends to provide passageways for other intercepting elements of the machine, and mechanism joining said halves out of the path of said other elements to cause the two halves of the ring to reciprocate as a unit.

31. In a machine for feeding particulated material, a housing ring member, a single horizontal feeder disc table housed by the member and rotatably supported therein, a feed pipe means for feeding the material directly from said pipe centrally of the disc, means for rapidly rotating the disc to cause the material by centrifugal action to spread out evenly over the entire disc and discharge at a uniform rate at its periphery, the said member having material passages therein with openings at the periphery of the disc to receive and divide said material into a plurality of individual streams as it is discharged from the disc, chute means separately continuing each of said passages through the machine to the points of delivery of the material, and control gates mounted on the said member at the periphery of the disc and at the openings of the material passages of the member, said gates when closed forming a stationary retaining rim for the material on the disc.

32. In a machine for feeding particulated material, a ring member, a single horizontal feeder disc table housed by the member and rotatably supported therein, means for feeding the material centrally of the disc, means for rapidly rotating the disc to cause the material by centrifugal action to spread out evenly over the disc and discharge at a uniform rate at its periphery, the said member around the edge of the disc being formed into a plurality of openings to receive the material discharged from the disc and thereby to divide it into a plurality of uniform streams, control gates associated with the said member at the periphery of the disc and at said openings and forming when closed a stationary retaining rim for the material at the periphery of the disc, and chute-like passages connecting with said openings and individually conducting the said streams through the machine to their ultimate points of delivery.

33. In a machine of the class described, a rapidly rotatable feeder table disc having a substantially flat upper surface having a central inwardly and upwardly sloping projection, a feed supply pipe substantially less in diameter than the disc vertically over the center of the disc with its lower end edge relatively adjustable toward and from the flat face of the disc, the upper face of the disc being smooth including the sloping surface of the projection, whereby the material is caused to flow out onto the disc by centrifugal action in an even, uniform layer and toward the edge of the disc, receivers for said material at the periphery of the disc said receivers dividing the peripheral flow of material into a plurality of individual streams and conducting the streams separately through the machine to their points of delivery, and control gates at the said periphery and for said receivers, said gates when closed forming a stationary retaining rim for said disc to retain the material thereon.

34. In a machine of the class described, a single rapidly rotating centrifugal feeder disc having a substantially flat top but with a central conical projection, the upper face of the disc and sloping surface of the projection being smooth, a support for said disc, a supply pipe having its open end surrounding said projection and adjustable toward and from the face of said disc for feeding the material centrally only to the face of the disc and the disc being substantially larger in diameter than said pipe, partition means at the periphery of the disc dividing the flow of material therefrom into a plurality of small streams, a chute-like passage for each of said individual streams and containers adapted to be filled by the material from said passages wherefrom each stream is preserved intact from the formation thereof until ultimate delivery to a container.

35. In a machine for feeding particulated material, a single horizontal, rapidly rotatable disc interposed in the downward stream of material, a feed pipe for said stream, said disc having a cone-like central projection on its upper face extending into the stream of material, the said pipe being larger in diameter than said projection and tending to spread it out evenly over the disc, said disc extending substantially beyond the said stream and the material traveling over the face of the disc and being discharged from the periphery thereof by centrifugal force, partitions at the periphery of the disc dividing the said peripherally discharged material into small streams, conducting means for each of said streams for preserving them individually intact from their formation to their ultimate disposition into containers each adapted to receive one of said individual streams.

36. In a machine for feeding particulated material, a ring member, a single horizontal feeder disc table housed by the said member and rotatably supported therein, means for feeding the material centrally only of the disc, means for rapidly rotating the disc to cause the material by centrifugal action to spread out evenly over the disc and discharge at a uniform rate at its periphery, the member around and above the edge of the disc having vertical webs approaching the disc and dividing the ring-like space in the member into a plurality of vertical openings at and above the edge of the disc to receive the material as it is caused by the centrifugal action to be thrown or discharged therefrom, control gates mounted on said member and positioned at the periphery of the disc and at said openings, and chutes leading downwardly from said openings for the separate handling of the individual streams of material from said openings.

37. In an automatic weighing and filling machine, means for feeding material thereto, means for separating said material into a plurality of individual streams, which latter are maintained individually intact until ultimate disposition of each of them, vertically movable weighing buckets, a control chamber in advance of and over each bucket in the line of flow of each of the individual streams of the material being handled, means for feeding a full individualized stream of material through each said control chamber, an outlet gate for each said chamber, an inlet gate therefor, said inlet and outlet gates being responsive as to closing to the weight of material in the bucket, and the outlet gate being laterally movable with respect to the stream of material in the control chamber and located substantially at the entrance to the bucket whereby a full individualized stream may be utilized in weighing and only a small unweighed amount of material reaches the bucket at each filling.

38. In an automatic weighing and filling machine, a horizontal rotary feeding disc over the face of which the material being fed is adapted to spread in a layer-like form, means for separating said material into a plurality of individual streams, which latter are maintained individually intact until ultimate disposition of each of them, vertically movable weighing buckets arranged below the level of said disc, control chambers between the periphery of the disc and said buckets, respectively to receive the material from the disc and direct it to the weighing buckets, inlet and outlet gates for each of said control chambers, the inlet gate being adjacent the disc and the outlet gate adjacent the bucket, said gates being responsive as to closing to the weight of the material in the bucket, and each outlet gate being laterally movable with respect to the stream of material from its control chamber and located substantially at the entrance to the weighing bucket.

39. An automatic multiple weighing and filling machine for particulated materials comprising a source of bulk supply of said material, a horizontal rapidly rotating feeder disc, means for feeding the material from said source to and centrally of said disc from which it spreads over the face of the disc and travels to the periphery thereof under the influence of centrifugal force, a plurality of gates at the periphery of the disc to divide the flow into corresponding streams when open and to form a peripheral wall for the disc when closed, control chambers in communication with the openings provided when the gates are open, a weighing bucket fed by each control chamber, and connections between the bucket and the gates of its control chamber to close the same when the bucket receives its weight of material.

40. In a machine of the class described, a relatively large horizontal rapidly rotating centrifugal feeder disc, means for feeding material centrally to said disc on which it spreads over the face thereof and travels to the periphery of the disc under the influence of centrifugal force, a plurality of dividing members at the periphery of the disc to divide the flow of said material into corresponding individual streams, material receiving means having openings at the periphery of the disc and dividing the discharge into a plurality of streams, additional means positioned below said material receiving means, said material receiving means and said additional means forming a substantially continuous tube-like structure to conduct the streams individually through the machine to preselected individual receptacles, and gates at the periphery of the disc controlling said streams and forming a stationary peripheral material retaining wall for the disc when closed.

41. In a machine of the class described, a single horizontal rapidly rotated centrifugal feeding disc, a supply pipe over the center of the disc to feed material thereto, the feed disc being substantially greater in diameter than the ring of material from the end of the pipe due to gravity and the angle of repose of the material, the material spreading over the face of the disc and travelling to the periphery thereof under the influence of centrifugal force, material receiving means having openings at the periphery of the disc and dividing the discharge into a plurality of streams, additional means positioned below said material receiving means, said material receiving means and said additional means forming a substantially continuous tube-like structure to conduct the streams individually through the machine to preselected individual receptacles, said tube-like structures being in the form of descending chutes having their open upper ends arranged around said periphery to receive one of each of said plurality of streams, and movable gates at said open ends stationarily located with respect to and at the periphery of the disc to permit the flow of material over the periphery thereof when open and into said chutes, said gates forming a stationary peripheral wall about the disc when closed to dam and stop said flow, said chutes separately conducting said streams to their points of delivery.

JOHN L. FERGUSON.
RICHARD C. TALBOT.

REFERENCES CITED

The following references are of record in the file of this patent:

UNITED STATES PATENTS

| Number | Name | Date |
|---|---|---|
| 204,454 | Russell | June 4, 1878 |
| 315,730 | Clawson | Apr. 14, 1885 |
| 339,566 | Longsdon | Apr. 6, 1886 |
| 570,109 | Smyser | Oct. 27, 1896 |
| 592,774 | Frazier | Nov. 2, 1897 |
| 607,472 | Richards | July 19, 1898 |
| 607,474 | Richards | July 19, 1898 |
| 643,102 | Bates | Feb. 13, 1900 |
| 667,560 | Nickerson | Feb. 5, 1901 |
| 736,962 | Ham | Aug. 25, 1903 |
| 754,937 | Patterson | Mar. 15, 1904 |
| 756,307 | Wheildon | Apr. 5, 1904 |
| 870,979 | Mallett | Nov. 12, 1907 |
| 889,278 | Ware | June 2, 1908 |
| 1,013,136 | Deats | Jan. 2, 1912 |
| 1,072,956 | Keil et al. | Sept. 9, 1913 |
| 1,075,903 | Dewey | Oct. 14, 1913 |
| 1,183,509 | Weissman et al. | May 16, 1916 |
| 1,189,416 | Zanone | July 4, 1916 |
| 1,203,285 | Webber | Oct. 31, 1916 |
| 1,262,256 | Redd | Apr. 9, 1918 |
| 1,348,885 | Laffoon | Aug. 10, 1920 |
| 1,724,700 | Ermold | Aug. 13, 1929 |
| 1,764,108 | Kennedy | June 17, 1930 |
| 1,786,085 | Preble | Dec. 23, 1930 |
| 1,856,426 | Pettibone | May 3, 1932 |
| 1,857,495 | Chase | May 10, 1932 |
| 1,884,666 | Guenther | Oct. 25, 1932 |
| 1,903,188 | Middelboe | Mar. 28, 1933 |
| 1,936,105 | Cole | Nov. 21, 1933 |
| 1,972,841 | Guenther | Sept. 4, 1934 |
| 2,048,124 | Hume | July 21, 1936 |
| 2,076,640 | Howard | Apr. 13, 1937 |
| 2,097,522 | Hanique | Nov. 2, 1937 |
| 2,111,921 | Bleam | Mar. 22, 1938 |
| 2,162,219 | Howard | June 13, 1939 |
| 2,189,018 | Robinson | Feb. 6, 1940 |
| 2,204,134 | Howard | June 11, 1940 |
| 2,227,640 | Ferguson | Jan. 7, 1941 |
| 2,298,119 | Gebert | Oct. 6, 1942 |
| 2,329,948 | Shallock | Sept. 21, 1943 |
| 2,340,531 | Howard | Feb. 1, 1944 |
| 2,387,585 | Howard | Oct. 23, 1945 |

FOREIGN PATENTS

| Number | Country | Date |
|---|---|---|
| 219,909 | Germany | Mar. 11, 1910 |
| 407,902 | Germany | Jan. 6, 1925 |
| 424,975 | Germany | Feb. 9, 1926 |
| 430,985 | Great Britain | June 28, 1935 |
| 527,407 | France | July 25, 1921 |
| 596,545 | Germany | May 8, 1934 |